(12) United States Patent
Nishira et al.

(10) Patent No.: US 7,418,372 B2
(45) Date of Patent: Aug. 26, 2008

(54) MODEL PREDICTIVE CONTROL APPARATUS

(75) Inventors: Hikaru Nishira, Yokohama (JP);
Taketoshi Kawabe, Fukuoka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 649 days.

(21) Appl. No.: 11/128,271

(22) Filed: May 13, 2005

(65) Prior Publication Data
US 2005/0267608 A1 Dec. 1, 2005

(30) Foreign Application Priority Data
May 27, 2004 (JP) ............... 2004-157682

(51) Int. Cl.
*G06F 17/10* (2006.01)
(52) U.S. Cl. ............... 703/2; 703/8; 706/21; 700/44; 701/96; 701/117; 701/301
(58) Field of Classification Search ............... 703/2, 703/8; 700/28–31, 44; 706/21; 701/96, 701/117, 301
See application file for complete search history.

(56) References Cited

U.S. PATENT DOCUMENTS

| | | | |
|---|---|---|---|
| 5,424,942 A * | 6/1995 | Dong et al. ............ | 700/44 |
| 6,330,507 B1 | 12/2001 | Adachi et al. | |
| 6,865,562 B2 * | 3/2005 | Fromherz et al. ......... | 706/14 |
| 6,912,515 B2 * | 6/2005 | Jackson et al. .......... | 706/19 |
| 6,934,931 B2 * | 8/2005 | Plumer et al. .......... | 717/104 |
| 7,089,220 B2 * | 8/2006 | Fromherz et al. ......... | 706/45 |
| 7,089,221 B2 * | 8/2006 | Fromherz et al. ......... | 706/46 |

FOREIGN PATENT DOCUMENTS

| | | |
|---|---|---|
| JP | 7-191709 | 7/1995 |
| JP | 2000-135934 | 5/2000 |

OTHER PUBLICATIONS

Payton et al., D. Intelligent Real-Time Control of Robotic Vehicles, Communications of the ACM, Aug. 1991, pp. 48-63.*
Gao et al., J. Performance Evaluation of Two Industrial MPC Controllers, Control Engineering Practice, vol. 1, Dec. 2003, pp. 1371-1387.*
Gu et al., D. Neural Predictive Control for a Car-Like Mobile Robot, Robotics and Autonomous Systems, vol. 39, May 2002, pp. 73-86.*
Onnen et al., C. Genetic Algorithms for Optimization in Predictive Control, Control Engineering Practice, vol. 5, Oct. 1997, pp. 1363-1372.*
Toshiyuki Ohtsuka, "Continuation/GMRES Method for Fast Algorithm of Nonlinear Receding Horizon Control," Proc. 39th IEEE Conference on Decision and Control, pp. 766-771, 2000.

* cited by examiner

*Primary Examiner*—Russell Frejd
(74) *Attorney, Agent, or Firm*—Foley & Lardner LLP

(57) ABSTRACT

A model predictive control apparatus includes an initial solution generation section, an abnormality handling section, and an objective function adjustment section. The abnormality handling section performs initial solution generation when it is determined that performed optimization is abnormal. The initial solution generation section generates an initial optimal value of a future time series control input in accordance with an initial objective function, without reference to a candidate value of the time series control input. The objective function adjustment section adjusts the current objective function so that the current objective function varies stepwise with time toward the normal objective function when it is determined that the current objective function is different from the normal objective function.

26 Claims, 16 Drawing Sheets

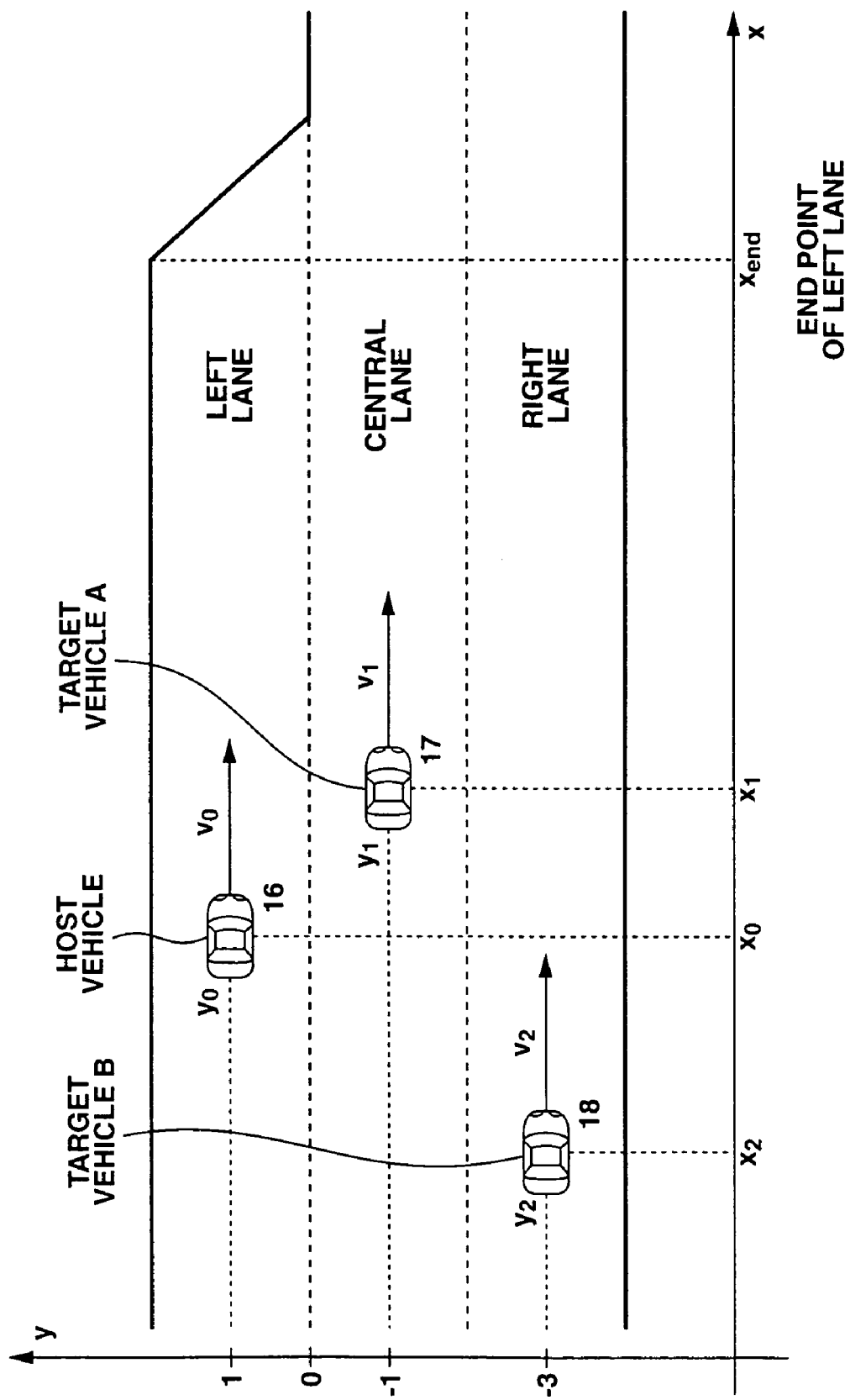

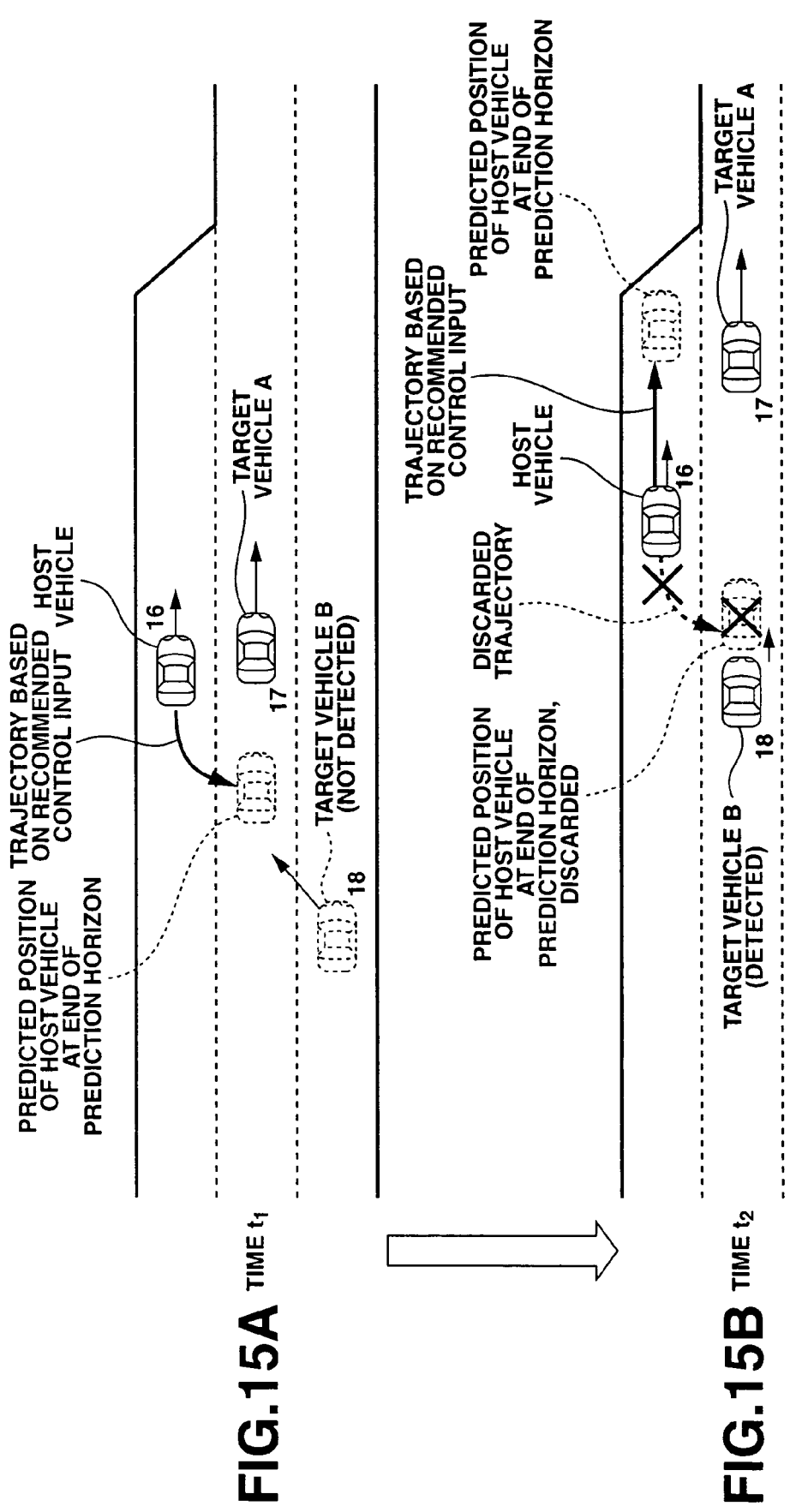

CASE 1

$u_x^*(t;t) = 0.62 \text{ m/s}^2$ $u_y^*(t;t) = -1$ $y_0(t) = 1$

CASE 2

$u_x^*(t;t) = -0.30 \text{ m/s}^2$ $u_y^*(t;t) = 1$ $y_0(t) = 1$

MODEL PREDICTIVE CONTROL APPARATUS

BACKGROUND OF THE INVENTION

The present invention relates generally to model predictive control apparatus, and more particularly to model predictive control apparatus for automotive vehicles which predicts future dynamic behaviors of the host vehicle and target vehicles around the host vehicle, and optimizes a control input to the host vehicle in accordance with the prediction.

In recent years, there have been proposed and disclosed various model predictive control (MPC, or model-based predictive control (MPDC)) systems. In general, a model predictive control method is configured to predict a time series of a state of a system in accordance with a mathematical model of the system, to define an objective function to numerically evaluate the predicted time series system state and a future time series of a control input to force the system state to track its setpoint, to calculate an optimal value of a future time series of the control input which minimizes the objective function, and to input the calculated optimal value of the control input to the system.

A Published Japanese Patent Application No. H7(1995)-191709 (hereinafter referred to as "H7-191709") shows a parameter setting method for the model predictive control. The method disclosed in H7-191709 is configured to check the condition numbers of matrices whose inverse matrices are calculated and used in its computational process, when parameters of a model predictive control system are changed, and to adjust a weight for a control input in an associated objective function so that the condition numbers are held within predetermined bounds. Incidentally, the condition number of a matrix A is the ratio of its maximum singular value to its minimum singular value. The condition number is a measure of the sensitivity of solution of Ax=b to perturbations of A or b (x and b are vectors). In other words, the condition number is a measure of the numerical accuracy of its inverse matrix $A^{-1}$. In general, with increasing condition number of a matrix, the numerical accuracy of its inverse matrix decreases so that it becomes more difficult to accurately calculate its inverse matrix. Thus, the method disclosed in H7-191709 has intention to prevent the control input from violating its constraints due to computational errors or computational abnormality, monitoring the condition numbers of the matrices concerned. When there is a possibility that a large condition number adversely affects the control computation, the method increases the weights for the control input in the objective function to equivalently reduce the condition number, and to hold the stability of the control computation.

A Published Japanese Patent Application No. 2000-135934 shows an automatic vehicular velocity control apparatus for automotive vehicle, which has intention to follow up a preceding vehicle which is running ahead of the vehicle at an appropriate inter-vehicle distance when the preceding vehicle has been recognized. In addition, a reference "T. Ohtsuka, "Continuation/GMRES method for fast algorithm of nonlinear receding horizon control" Proc. 39th IEEE Conference on Decision and Control, pp. 766-771, 2000" shows an algorithm for model predictive control in which the control input to a system is updated by a differential equation to trace the solution of an associated two-point boundary-value problem.

SUMMARY OF THE INVENTION

In a model predictive control method, its prediction inaccuracy adversely affects its control performance, because the current value of a control input to a system is determined in accordance with a predicted value of future time series system state as mentioned above. In general, a model predictive control method is configured to use the immediately preceding optimal solution calculated in the immediately preceding control cycle, for example, is configured to provide an objective function including a term whose value increases with increasing differential between the current optimal solution and the immediately preceding optimal solution, so as to reduce the optimal solution differential. In some model predictive control systems, however, it is possible that the control input is desired to largely change from the immediately preceding control input, for some reasons, for example, for reasons of an increase in prediction inaccuracy. In such a situation, it is possible that the numerical condition of the control computation varies adversely. The method disclosed in H7-191709 is configured to increase the weight for the term concerning the control input differential in order to improve the numerical condition. However, this operation also tends to reduce the control input change so that it is possible that the response to a fast change in the situation is delayed. In a case the model predictive control is applied to a driver support apparatus of an automotive vehicle, it is possible that its delayed response to the situation change has a significant problem. For example, in a situation in which an automotive vehicle is performing merging or lane change, which are unique to driving an automotive vehicle, it is desired to quickly respond to the situation change. In that situation, it is possible that the response of the above-mentioned method of improving the numerical condition is delayed. As mentioned above, the method disclosed in H7-191709 is configured to reduce the control input change in order to improve the numerical condition in some situations. Therefore, it is possible that the control input is not controlled as desired in a case the response to the situation change is desired to be quick.

Accordingly, it is an object of the present invention to provide a model predictive control apparatus capable of quickly responding to a change in an environmental situation in accordance with prediction of a target system.

According to one aspect of the present invention, a model predictive control apparatus comprises: a sensing section configured to measure a state of a physical system; and a control unit connected electrically to the sensing section for receiving a sensing signal indicative of the measured system state, the control unit comprising: a system behavior prediction section configured to perform the following: predicting a future time series of the system state over a prediction horizon of time in accordance with the measured system state, and a future time series of a control input to the system over a control horizon of time; an objective function reference section configured to perform the following: providing a normal value of function definition data defining a normal objective function, the function definition data defining an objective function configured to provide a quantitative measure, in accordance with the time series system state, the time series control input, and a time series of a setpoint of the system state over the prediction horizon; providing an initial value of the function definition data defining an initial objective function; and providing a current value of the function definition data defining a current objective function; an initial solution generation section configured to perform the following: setting the current function definition data value to the initial function definition data value; generating an initial optimal value of the time series control input in accordance with the initial function definition data value, without reference to a candidate value of the time series control input; setting an optimal value of the time series control input to the initial optimal value of the time series control input; and setting the next candidate value of the time series control input to the initial optimal value of the time series control input; an optimization section configured to perform the following: calculating an optimal value of a time series control input correction over the control horizon in accordance with the current function definition data value, and the candidate value of the time series control input, the control input correction being a differential between the control input and the candidate control input value; setting the optimal value of the time series control input to a sum of the candidate value of the time series control input and the optimal value of the time series control input correction; and setting the next candidate value of the time series control input; an abnormality handling section configured to perform the following: determining whether or not the performed optimization in the optimization section is abnormal; and performing the initial solution generation when it is determined that the performed optimization is abnormal; an objective function adjustment section configured to perform the following: comparing the current function definition data value with the normal function definition data value; and adjusting the current function definition data value so that the current objective function varies stepwise with time toward the normal objective function when it is determined that the current function definition data value is different from the normal function definition data value; and an output section configured to perform the following: determining an output value of the control input in accordance with the optimal value of the time series control input; and outputting an output signal in accordance with the output value of the control input.

According to another aspect of the invention, a model predictive control apparatus for a host automotive vehicle, comprises: a sensing section configured to detect a target vehicle present around the host vehicle, and to measure a state of a physical system including the host vehicle and the target vehicle; and a control unit connected electrically to the sensing section for receiving a sensing signal indicative of the measured system state, the control unit comprising: a system behavior prediction section configured to perform the following: predicting a future time series of the system state over a prediction horizon of time in accordance with the measured system state, and a future time series of a control input to the host vehicle over a control horizon of time; an objective function reference section configured to perform the following: providing a normal value of function definition data defining a normal objective function, the function definition data defining an objective function configured to provide a quantitative measure, in accordance with the time series system state, the time series control input, and a time series of a setpoint of the system state over the prediction horizon; providing an initial value of the function definition data defining an initial objective function; and providing a current value of the function definition data defining a current objective function; an initial solution generation section configured to perform the following: setting the current function definition data value to the initial function definition data value; generating an initial optimal value of the time series control input in accordance with the initial function definition data value, without reference to a candidate value of the time series control input; setting an optimal value of the time series control input to the initial optimal value of the time series control input; and setting the next candidate value of the time series control input to the initial optimal value of the time series control input; an optimization section configured to perform the following: calculating an optimal value of a time series control input correction over the control horizon in accordance with the current function definition data value, and the candidate value of the time series control input, the control input correction being a differential between the control input and the candidate control input value; setting the optimal value of the time series control input to a sum of the candidate value of the time series control input and the optimal value of the time series control input correction; and setting the next candidate value of the time series control input; an abnormality handling section configured to perform the following: determining whether or not the performed optimization in the optimization section is abnormal; and performing the initial solution generation when it is determined that the performed optimization is abnormal; an objective function adjustment section configured to perform the following: comparing the current function definition data value with the normal function definition data value; and adjusting the current function definition data value so that the current objective function varies stepwise with time toward the normal objective function when it is determined that the current function definition data value is different from the normal function definition data value; and an output section configured to perform the following: determining a recommended value of the control input in accordance with the optimal value of the time series control input; and outputting an output signal in accordance with the recommended value of the control input.

According to a further aspect of the invention, a model predictive control apparatus comprises: sensing means for measuring a state of a physical system; and control means for receiving a sensing signal indicative of the measured system state, the control means comprising: system behavior prediction means for performing the following: predicting a future time series of the system state over a prediction horizon of time in accordance with the measured system state, and a future time series of a control input to the system over a control horizon of time; objective function reference means for performing the following: providing a normal value of function definition data defining a normal objective function, the function definition data defining an objective function configured to provide a quantitative measure, in accordance with the time series system state, the time series control input, and a time series of a setpoint of the system state over the prediction horizon; providing an initial value of the function definition data defining an initial objective function; and providing a current value of the function definition data defining a current objective function; initial solution generation means for performing the following: setting the current function definition data value to the initial function definition data value; generating an initial optimal value of the time series control input in accordance with the initial function definition data value, without reference to a candidate value of the time series control input; setting an optimal value of the time series control input to the initial optimal value of the time series control input; and setting the next candidate value of the time series control input to the initial optimal value of the time series control input; optimization means for performing the following: calculating an optimal value of a time series control input correction over the control horizon in accordance with the current function definition data value, and the candidate value of the time series control input, the control input correction being a differential between the control input and the candidate control input value; setting the optimal value of the time series control input to a sum of the candidate value of the time series control input and the optimal value of the time series control input correction; and setting the next candidate value of the time series control input; abnormality handling means for performing the following: determining whether or not the performed optimization in the optimization means is abnormal; and performing the initial solution generation when it is determined that the performed optimization is abnormal; objective function adjustment means for performing the following: comparing the current function definition data value with the normal function definition data value; and adjusting the current function definition data value so that the current objective function varies stepwise with time toward the normal objective function when it is determined that the current function definition data value is different from the normal function definition data value; and output means for performing the following: determining an output value of the control input in accordance with the optimal value of the time series control input; and outputting an output signal in accordance with the output value of the control input.

According to a still further aspect of the invention, a method of controlling a model predictive control apparatus including a sensing section configured to measure a state of a physical system, and a control unit connected electrically to the sensing section for receiving a sensing signal indicative of the measured system state, comprises: predicting a future time series of the system state over a prediction horizon of time in accordance with the measured system state, and a future time series of a control input to the system over a control horizon of time; providing a normal value of function definition data defining a normal objective function, the function definition data defining an objective function configured to provide a quantitative measure, in accordance with the time series system state, the time series control input, and a time series of a setpoint of the system state over the prediction horizon; providing an initial value of the function definition data defining an initial objective function; providing a current value of the function definition data defining a current objective function; setting the current function definition data value to the initial function definition data value; generating an initial optimal value of the time series control input in accordance with the initial function definition data value, without reference to a candidate value of the time series control input; setting an optimal value of the time series control input to the initial optimal value of the time series control input; setting the next candidate value of the time series control input to the initial optimal value of the time series control input; calculating an optimal value of a time series control input correction over the control horizon in accordance with the current function definition data value, and the candidate value of the time series control input, the control input correction being a differential between the control input and the candidate control input value; setting the optimal value of the time series control input to a sum of the candidate value of the time series control input and the optimal value of the time series control input correction; setting the next candidate value of the time series control input; determining whether or not the performed optimization is abnormal; performing the initial optimal value generation when it is determined that the performed optimization is abnormal; comparing the current function definition data value with the normal function definition data value; adjusting the current function definition data value so that the current objective function varies stepwise with time toward the normal objective function when it is determined that the current function definition data value is different from the normal function definition data value; determining an output value of the control input in accordance with the optimal value of the time series control input; and outputting an output signal in accordance with the output value of the control input.

The above objects and other objects, features, and advantages of the present invention are readily apparent from the following detailed description of the best modes for carrying out the invention when taken in connection with the accompanying drawings.

BRIEF DESCRIPTION OF THE DRAWINGS

FIG. 14 illustrates how the model predictive control apparatus in accordance with the third embodiment of the present invention operates in a sample case.

FIGS. 15A and 15B illustrate how the model predictive control apparatus in accordance with the third embodiment of the present invention operates in a sample case in which an abnormal solution is detected.

DETAILED DESCRIPTION OF THE INVENTION

Figure 1:
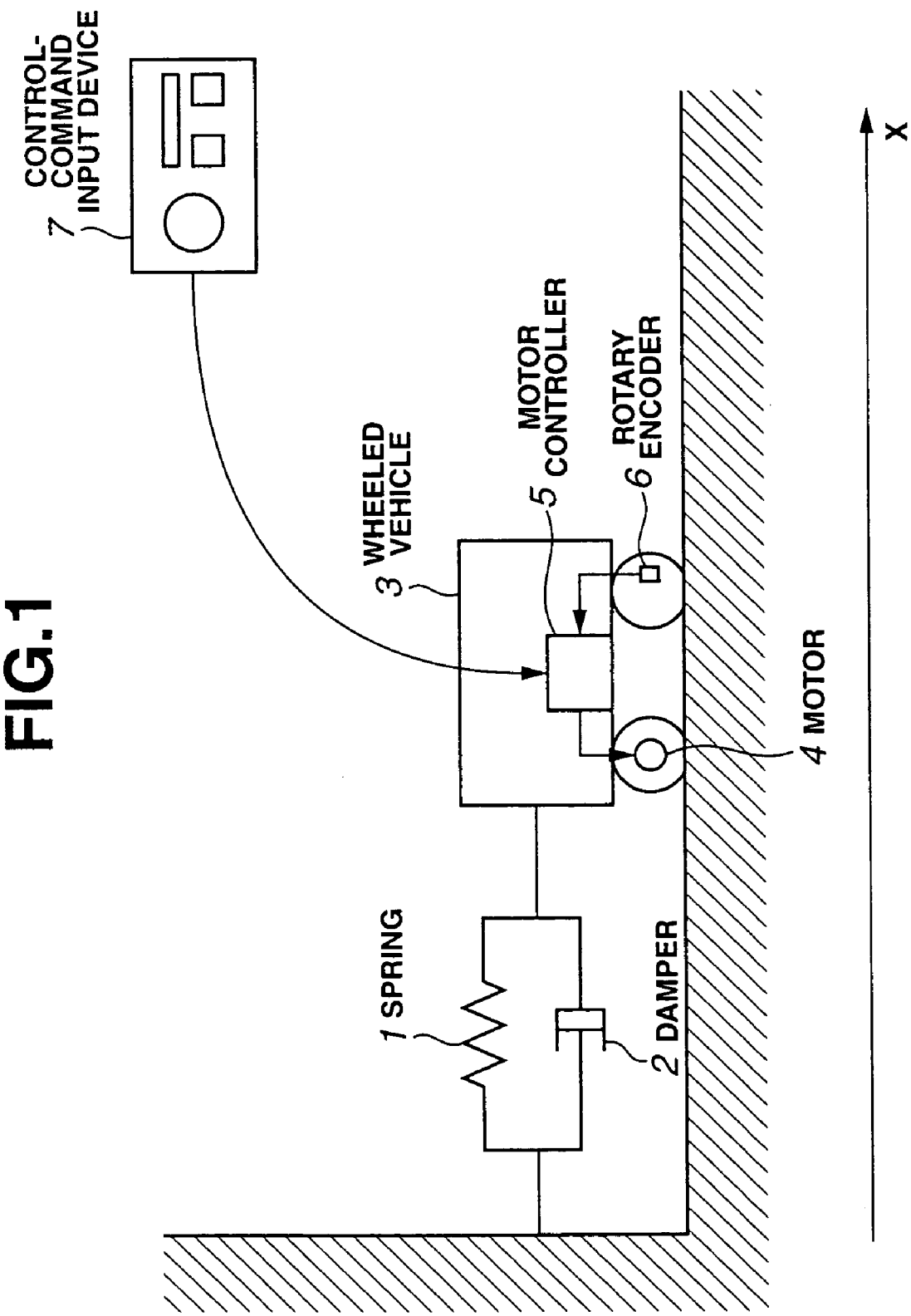
FIG. 1 is a schematic diagram of a model predictive control apparatus in accordance with a first embodiment of the present invention.

Referring now to FIGS. 1 through 4D, there is shown a model predictive control apparatus in accordance with a first embodiment of the present invention. FIG. 1 is a schematic diagram of the model predictive control apparatus. As shown in FIG. 1, a wheeled vehicle 3 is connected to a left side wall through a spring 1 and a damper 2 disposed in parallel. Wheeled vehicle 3 is equipped with a motor 4, a motor controller 5 as a control unit, and a rotary encoder 6. Receiving a control command from a control-command input device 7, motor controller 5 actuates motor 4 to control a horizontal position of wheeled vehicle 3 in accordance with the control command. A coordinate system is defined so that its x-coordinate indicates the horizontal position of wheeled vehicle 3 and the origin point is a position of wheeled vehicle 3 in a condition in which spring 1 is in its neutral condition.

With u representing the torque generated by motor 4, the motion of wheeled vehicle 3 is described by the following differential equation (E1).

$$m\ddot{x} = -d(\dot{x})\dot{x} - kx + ru \quad (E1)$$

where m is the mass of wheeled vehicle 3, k is the spring constant of spring 1, r is the reciprocal of the semidiameter of the wheels of wheeled vehicle 3, d(v) is a function of speed v which indicates the damping coefficient of damper 2 with respect to speed v. $\dot{x}$ and $\ddot{x}$ represent the first and the second derivative of x with respect to time t, respectively. d(v) is described by the following approximate equation (E2).

$$d(v) = d_0 v^2 \quad (E2)$$

where $d_0$ is a positive scalar constant.

Rotary encoder 6 is configured as a sensing section to measure a state of a physical system, that is, to measure the position x and the speed $\dot{x}$ of wheeled vehicle 3 by detecting pulse signals generated along with rotation of the associated wheel. Rotary encoder 6 is connected electrically to motor controller 5, so that the signals indicative of the position x and the speed $\dot{x}$ are sent to motor controller 5 for use in its control computation.

Motor controller 5 includes a microcomputer, its peripheral devices, and a current control device. Specifically, motor controller 5 includes an input/output interface (I/O), memories (RAM, ROM), and a microprocessor or a central processing unit (CPU). The input/output interface (I/O) of motor controller 5 receives input information from sensors, namely, rotary encoder 6, and from control-command input device 7. Within motor controller 5, the central processing unit (CPU) allows the access by the I/O interface of input informational data signals from the sensors. The CPU of motor controller 5 is responsible for carrying out the control program stored in the memories and is capable of performing necessary arithmetic and logic operations. Computational results, that is, calculated output signals are relayed through the output interface circuitry of motor controller 5 to output stages, motor 4 through the current control device. Thus, motor controller 5 receives control signals from rotary encoder 6 and control-command input device 7, processes the control signals using the program stored in its internal memory, and generates a driving current to drive motor 4 accordingly.

Figure 2:
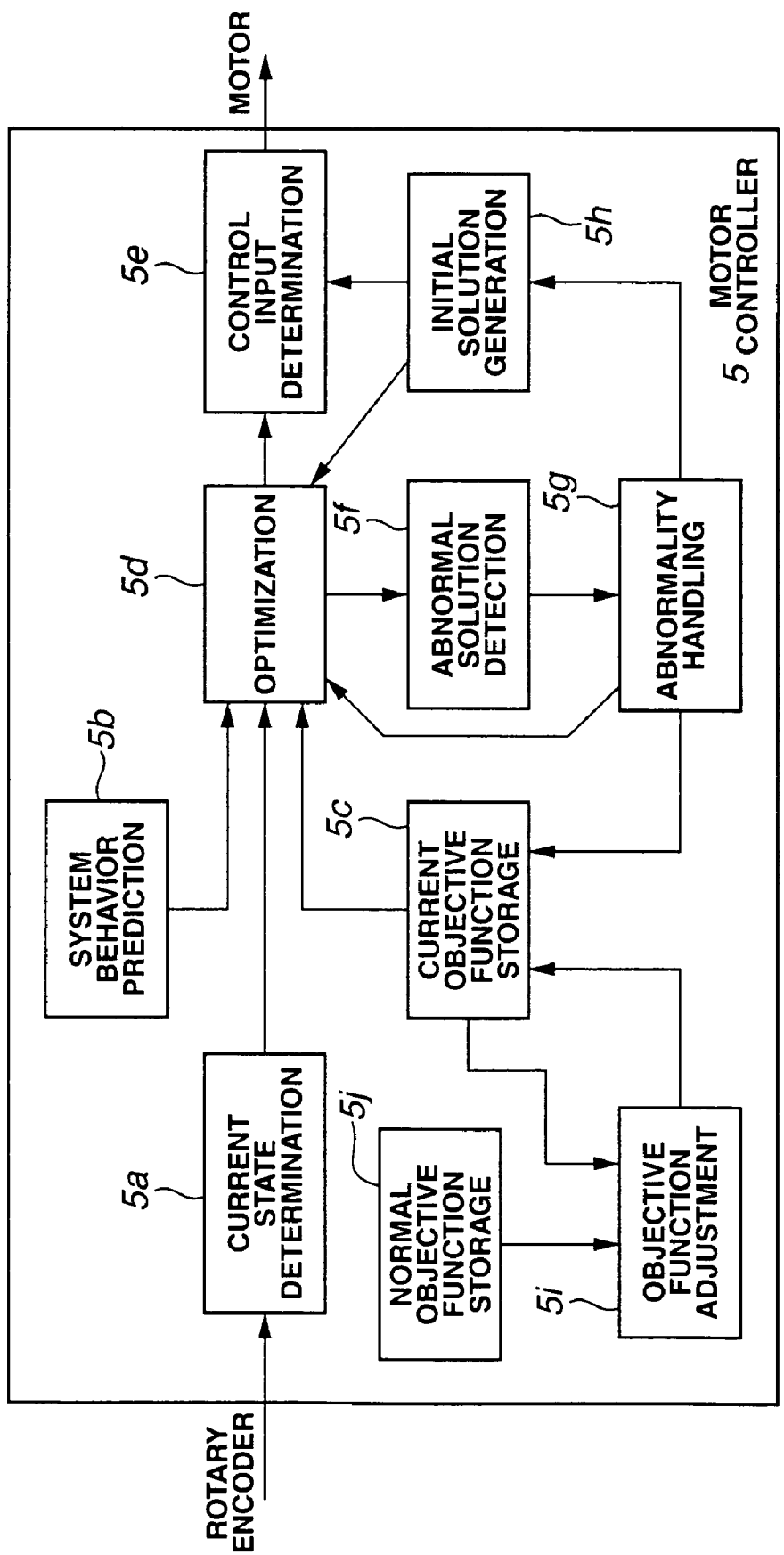
FIG. 2 is a functional block diagram of a motor controller of the model predictive control apparatus in accordance with the first embodiment of the present invention.

FIG. 2 shows software modules or functional sections 5a through 5j of the program stored in motor controller 5. Thus, motor controller 5 is equipped with an algorithm base on the model predictive control. In general, a model predictive control method is configured to predict a time series of a state of a system in accordance with a mathematical behavior prediction model of the system, to define an objective function (or an evaluation function or a cost function) to numerically evaluate the predicted future time series system state and a future time series of a control input (or manipulated variables) to force the system state to track its setpoint, to calculate an optimal value of the future time series control input which minimizes the objective function, and to input the calculated value of the control input to the system.

In general, with x representing a state of a target system (controlled variables, a vector in general) and u representing a control input to the system (a vector in general), the mathematical model of the behavior of the system is described by the following differential equation (E3).

$$\dot{x} = f(x, u) \quad (E3)$$

The objective function J is assumed to be the following form of equation (E4).

$$J[u(t'; t)] = \int_{t}^{t+T} L(x(t'), u(t'), t') dt' \quad (E4)$$

where t is the current instant, t' is a future instant, T is the prediction horizon which is identical to the control horizon in the embodiments, and L is a function indicating an instantaneous objective function at each future instant. u(t';t) represents a future time series of u(t') over a range of t≦t'≦t+T. With both of the system model (the equation (E3)) and the objective function (the equation (E4)) being defined, a problem of finding u which minimizes J is identical to a formulated optimal control problem, which is given an algorithm of solving the optimal control problem. In accordance with u*(t';t) which is obtained as the optimal solution of the optimization problem, the current control input are set to u*(t;t) for the current instant t. The foregoing is an overview of the model predictive control.

In this embodiment, a system includes a movable object, the state of the system includes a position and a velocity of the movable object, and a control input to the system includes a physical quantity to generate an acceleration of the movable object to change the position and velocity of the movable object. In FIG. 2, sections 5a through 5e of motor controller 5 serve to perform the above-mentioned basic model predictive control. Current state determination section 5a determines the measured position x(t) and speed v(t) of wheeled vehicle 3 in accordance with the pulse signal from rotary encoder 6. System behavior prediction section 5b is configured to predict a future time series of the system state over a prediction horizon of time in accordance with the measured system state, and a future time series of a control input to the system over a control horizon of time. More specifically, system behavior prediction section 5b stores the system model described by the equation (E1). With using v identical to ẋ, the equation (E1) is described by the following equation (E5).

$$\dot{x} = v$$

$$\dot{v} = -a_1 v^3 - a_2 x + bu \tag{E5}$$

where $a_1 = d_0/m$, $a_2 = k/m$, and $b = r/m$. Substitution of $x = (x,v)^T$, and $u = u$ into the equation (E3) shows that the equation (E5) is described in the general form of the equation (E3).

Current objective function storage section 5c stores a specific equation contained in the form of equation (E4). The following equation (E6) is used as an instantaneous objective function to be integrated over the prediction horizon.

$$L(x(t'),u(t'),t') = w_u u(t')^2 + w_x (x(t') - x^*(t'))^2 \tag{E6}$$

where x*(t') is a setpoint value (a desired value) of the position of wheeled vehicle 3 at future instant t' which is input from control-command input device 7, and $w_u$ and $w_x$ are positive scalar values indicating weights for u and x, respectively. Actually, current objective function storage section 5c stores and provides a normal value of function definition data defining a normal objective function. The function definition data serves to define an objective function configured to provide a quantitative measure, in accordance with the time series system state, the time series control input, and a setpoint of the time series system state. As mentioned below, an objective function reference group including current objective function storage section 5c and normal objective function storage section 5j also stores and provides an initial value of the function definition data defining an initial objective function, and a current value of the function definition data defining a current objective function.

Optimization section 5d is configured to determine the optimal value of the time series of the control input u*(t';t) which minimizes the objective function J, reading the measured position x(t) and speed v(t) of wheeled vehicle 3, the prediction model (the equation (E5)), and the instantaneous objective function (the equation (E6)).

If the system model (the equation (E3)) and or the objective function (the equation (E4)), which defines the optimization problem, includes a nonlinear term, the optimization problem is generally a nonlinear optimization problem. In general, it takes a lot of arithmetic operations to solve a nonlinear optimization problem, so that it is possible that real-time optimization computation in the model predictive control may cause a time delay to adversely affect the control performance of the model predictive control. In order to reduce the number of arithmetic operations or calculation cost, the model predictive control apparatus may initially and properly determine a candidate solution K as a candidate of the optimal value of the time series control input u*(t';t), and then find an optimal value of a time series control input correction Δu*(t';t) with respect to the candidate solution K, without directly determining u*(t';t). The control input correction Δu*(t';t) is a differential between the optimal solution u*(t';t) and the candidate solution K. If a control interval (also called a control period, or a sampling interval) Δt is sufficiently small, the change of the optimal solution over time may be assumed to be small in many cases. Therefore, the model predictive control apparatus may use the last optimal solution or the immediately preceding optimal value of the time series control input u*(t';t−Δt) as the candidate solution K, which is calculated in the immediately preceding control cycle. With the optimal correction Δu*(t';t) given, optimal solution u*(t';t) is calculated using the following equation (E7).

$$u^*(t';t) = u(t';t-\Delta t) + \Delta u^*(t';t) \tag{E7}$$

Thus, optimization section 5d determines the optimal solution u*(t';t) through the step of calculation of Δu*(t';t). Optimization section 5d may use such an optimization algorithm as disclosed in "T. Ohtsuka, "Continuation/GMRES method for fast algorithm of nonlinear receding horizon control" Proc. 39th IEEE Conference on Decision and Control, pp. 766-771, 2000". The entire contents of this document are hereby incorporated by reference.

Control input determination section 5e determines a current value of the control input to the system in accordance with the optimal value of the time series control input u*(t';t). Actually, in the shown embodiment, control input determination section 5e determines the current control input value as a final output value of the control input to be the current value u*(t;t) of the optimal value of the time series control input u*(t';t) in the usual manner of the model predictive control, and outputs an output signal indicative of the current control input value to motor 4 to generate a torque of the current control input value. Specifically, control input determination section 5e calculates an electric current needed for motor 4 to output the current control input value u*(t;t), and outputs a command signal indicative of the needed electric current to the current control device, to apply the commanded electric current to motor 4.

The foregoing describes the sequence of the normal control cycle to be repeatedly executed by the model predictive control apparatus, which implements the overall model predictive control. However, it is possible that this normal control cycle does not always work well in any condition. The optimization calculation executed by optimization section 5d includes a process of solving a system of simultaneous first order equations. If the equation system is in an ill numerical condition, it is possible that the accuracy of the optimal solution is adversely affected so that optimization section 5d finds an improper solution for the control of motor 4. In this embodiment, the control input u is constrained with an upper bound $u_P$ and a lower bound $u_N$ as the following equation (E8), because the output torque of motor 4 is finite.

$$-u_N \leq u \leq u_P \tag{E8}$$

where $u_N$ and $u_P$ are positive values of the control input to the system corresponding to the upper and lower bounds of the actual output torque of motor 4. When the accuracy of the optimal solution is adversely affected, it is possible that the control input u is determined to be out of the bounds of the equation (E8) for a control objective which can be actually satisfied with a value within the equation (E8). On the other hand, even when the accuracy of the optimal solution is held normal, it is possible that the control input u is determined to be out of the bounds of the equation (E8). In such abnormal conditions, motor controller 5 performs abnormality handling as mentioned below.

The following describes the detailed process of the optimization calculation. The horizon of the control (t≤t'≤t+T) is divided into N steps, and u*(t';t) is assumed to be constant in each of the divided steps. The finite time-varying function u*(t';t) is time-discretized and described by an N-dimensional vector having elements whose values are u*(t';t) at N steps, respectively. Finally, the problem is converted to the following system of simultaneous first order equations (E9).

$$A(t)X(t) = b(t) \quad (E9)$$

$$X(t) = \left[ \Delta u(t;t) \quad \Delta u\left(t + \frac{T}{N}; t\right) \quad \ldots \quad \Delta u\left(t + \frac{N-1}{N}T; t\right) \right] \quad (E10)$$

where matrix A(t) and vector b(t) are given according to the system model (the equation (E3)), the objective function (the equation (E4)), and the candidate solution K. The optimal value of the time series control input u*(t';t) is represented by U*(t) as the following equation (E11).

$$U^*(t) = \left[ u^*(t;t) \quad u^*\left(t + \frac{T}{N}; t\right) \quad \ldots \quad u^*\left(t + \frac{N-1}{N}T; t\right) \right] \quad (E11)$$

In order to find the optimal solution U*(t), first, the equation (E9) is solved to find the optimal correction X*(t). Subsequently, the optimal solution U*(t) is calculated using the following equation (E12), according to the equation (E7).

$$U^*(t) = U^*(t-\Delta t) + X^*(t) \quad (E12)$$

Abnormal solution detection section 5f is configured to determine whether or not the optimal control calculation is abnormal. When the optimal time series control input correction X*(t) or the optimal time series control input U*(t) satisfies at least one of the following abnormality conditions, abnormal solution detection section 5f determines that the optimal control calculation is abnormal.

(Condition C1) An element of the optimal time series control input U*(t) is out of bounds of the equation (E8).
(Condition C2) The square norm ||X*(t)|| is larger than a predetermined threshold value.
(Condition C3) A residual error of the system of simultaneous first order equations ||e||=||b(t)−A(t)X*(t)|| is larger than a predetermined threshold value.

The condition C1 serves to prevent the possibility of issuing a command signal indicative of a torque out of the allowable range. Actually, abnormal solution detection section 5f is configured to determine that the performed optimization is abnormal when the optimal value of the time series control input includes a value of an element of the control input which is out of certain associated bounds. The condition C2 serves to detect the adverse condition of the accuracy of the calculation of the system of simultaneous first order equations, based on the fact that X*(t) varies largely or includes a large error if the condition of the system of simultaneous first order equations is in an ill condition. Actually, abnormal solution detection section 5f is configured to determine that the performed optimization is abnormal when the optimal value of the time series control input correction includes a value of the control input correction whose magnitude is larger than a certain threshold value. The condition C3 is a typical condition applied to solution of a system of simultaneous first order equations with iterative calculation. The condition C3 is provided, based on the fact that the residual error tends to increase with increasing degree of adverse effect on calculation. Actually, in case optimization section 5d is configured to calculate the optimal value of the future time series control input correction by iterative calculations the number of which is bounded by a certain upper bound, abnormal solution detection section 5f is configured to determine that the performed optimization is abnormal when an error degree of the performed optimization is at or above a certain threshold level.

The above-mentioned abnormality conditions are often satisfied, when a large disturbance is input to the system to generate a large difference between the predicted value of the system state based on the equation is (E5) and the actual value of the system state, or when the objective function (the equation (E6)) varies largely in accordance with a change in the setpoint generated by the control command input device. In such cases, the assumption that the difference between the immediately preceding optimal solution and the current optimal solution is small does not hold. This adversely affects the accuracy of the linearity approximation of nonlinear terms in converting the original nonlinear optimization problem to the system of simultaneous first order equations. Therefore it is possible that the abnormality conditions are satisfied in such cases.

When an abnormal solution is detected, abnormality handling section 5g is initiated. Abnormality handling section 5g discards the calculated optimal solution U*(t) and the candidate solution U*(t−Δt), as a preparation to generation of a new normal optimal solution. Without reference to the candidate solution U*(t−Δt), the equation (E12), with which the candidate solution and the optimal correction is needed to calculate the optimal solution, is not available. Accordingly, motor controller 5 adopts another method of finding the optimal solution. Incidentally, a combination of abnormal solution detection section 5f and abnormality handling section 5g may be integrally referred to as an abnormality handling section.

In general, solution of an optimization problem takes a lot of arithmetic operations. However, if an optimization problem is defined by a specific type of system model and a specific type of objective function, the optimal solution is described by a relatively simple explicit function. In such a case, the optimal solution is obtained in a short period of time, without solving a system of simultaneous first order equations by inverse calculations and iterative calculations. Accordingly, in the shown embodiment, in order to obtain an optimal solution in a short period of time, the objective function is converted from the normal objective function (the equation (E6)) to a form of function for which the optimal solution is easily found. In case weight $w_x$ in the equation (E6) is changed to zero, u*(t';t)=0 is the optimal solution independently of x*(t') and the prediction horizon T. Thus, initial solution generation section 5h determines or provides an objective function for which the optimal solution is easily found (initial objective function), and generates an initial optimal solution for the initial objective function. When an abnormal condition of the calculation is detected, abnormality handling section 5g constructs the objective function by replacing the objective function stored in current objective function storage section 5c with an initial objective function for which the optimal solution is easily found, and initiates initial solution generation section 5h to generate the initial optimal solution. As mentioned above, the initial objective function is generated by changing weight $w_x$ to zero in the equation (E6). Thus, the initial objective function is configured to take less calculation cost to generate the optimal value of the time series control input without reference to the candidate value of the time series control input than the normal objective function. Actually, initial solution generation section 5h is configured to set the current function definition data value to the initial function definition data value, to generate an initial optimal value of the time series control input in accordance with the initial function definition data value, without reference to a candidate value of the time series control input, to set an optimal value of the time series control input to the initial optimal value of the time series control input, and to set the next candidate value of the time series control input to the initial optimal value of the time series control input.

In the above-mentioned manner, the abnormality handling is performed. However, if the objective function with $w_x$ being zero were held in the next control cycle, the normal control objective of controlling the system state to the desired system state would not be achieved. Therefore, weight $w_x$ is adjusted toward the original normal value. Objective function adjustment section 5i compares between the normal objective function (the normally weighted function (the equation E6)) stored in normal objective function storage section 5j and the current objective function (or reference objective function) stored in current objective function storage section 5c. When objective function adjustment section 5i detects that the current objective function is different from the normal objective function, objective function adjustment section 5i adjusts the current objective function toward the normal objective function. When an abnormal solution is detected in the immediately preceding control cycle, weight $w_x$ in the current objective function is zero. Objective function adjustment section 5i increases weight $w_x$ in the current objective function from zero. If weight $w_x$ increases in one step to the normal value, it is possible that the condition of the optimization problem is adversely affected to produce an abnormal solution. Therefore, objective function adjustment section 5i increases weight $w_x$ gradually stepwise with time. More specifically, weight $w_x$ is changed to the normal weight $w_x^*$ in accordance with an update law expressed by the following equation (E13).

$$w_x(t) = w_x(t - \Delta t) + \alpha \cdot (w_x^* - w_x(t - \Delta t))\qquad(E13)$$

where $\alpha$ is a positive constant value serving to determine the rate of change in weight $w_x$. The stepwise change of weight $w_x$ allows use of the algorithm used in optimization section 5d in which the correction solution is calculated with respect to the candidate solution. In this manner, the solution gradually approaches with time to the normal optimal solution. In general, in case the adjusted current objective function is a weighted average of the initial objective function and the normal objective function, objective function adjustment section 5i is configured to adjust the current function definition data value so that the weights for the initial objective function and the normal objective function in the adjusted current objective function vary stepwise with time, and so that the current objective function varies stepwise with time toward the normal objective function, when it is determined that the current function definition data value is different from the normal function definition data value.

Figure 3:
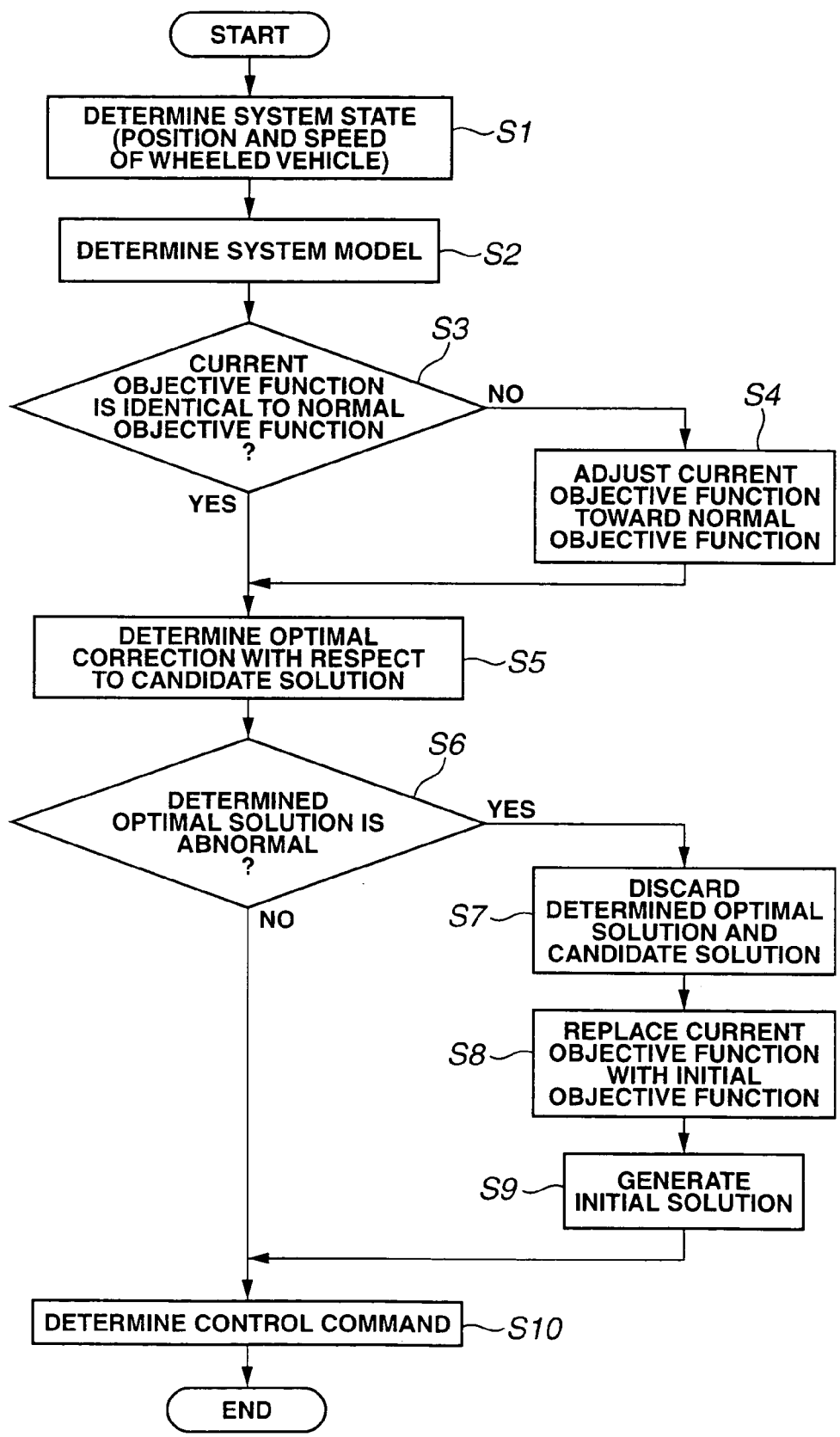
FIG. 3 is a flow chart depicting a routine to be executed by the motor controller in accordance with the first embodiment of the present invention.
Figure 4:
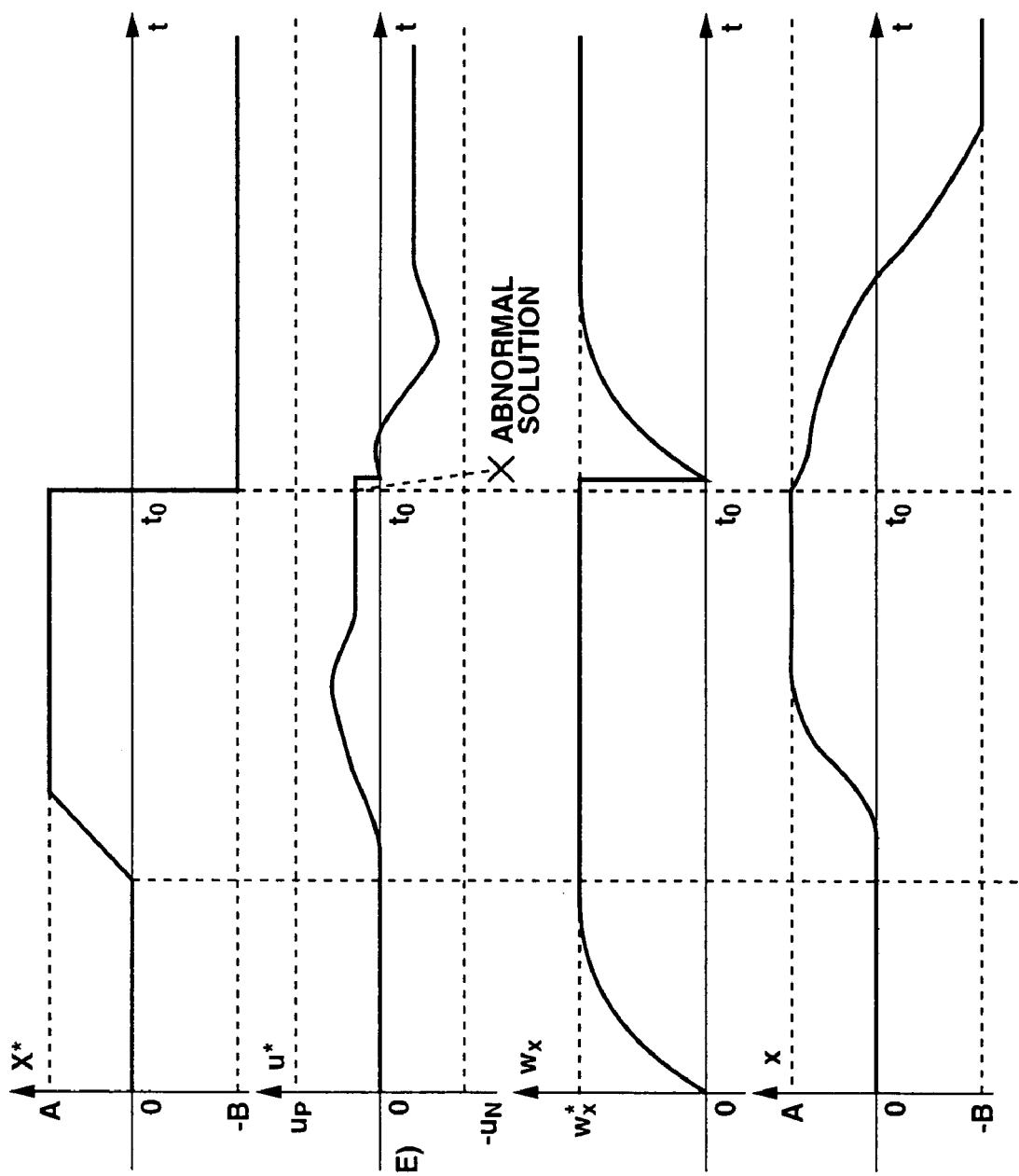
FIG. 4A is a graph depicting how a desired position of the wheeled vehicle changes over time in a case where the model predictive control apparatus in accordance with the first embodiment detects an abnormal solution.
FIG. 4B is a graph depicting how a control input (motor torque) changes over time in accordance with the desired position of FIG. 4A under the control of the model predictive control apparatus in accordance with the first embodiment.
FIG. 4C is a graph depicting how the weight for the position of the wheeled vehicle changes over time in accordance with the desired position of FIG. 4A under the control of the model predictive control apparatus in accordance with the first embodiment.
FIG. 4D is a graph depicting how the actual position of the wheeled vehicle changes over time in accordance with the desired position of FIG. 4A under the control of the model predictive control apparatus in accordance with the first embodiment.

FIG. 3 is a flow chart depicting the above-mentioned routine to be executed by motor controller 5 of the model predictive control apparatus. First, at step S1, motor controller 5 reads the sensing signal from rotary encoder 6, and determines the measured position x and speed $\dot{x}$ (=v) of wheeled vehicle 3 accordingly. Subsequently, at step S2, optimization section 5d reads the data concerning the system model stored in system behavior prediction section 5b. Subsequently, at step S3, objective function adjustment section 5i compares the normal objective function stored in normal objective function storage section 5j and the current objective function stored in current objective function storage section 5c. When the two objective functions are different from each other, the routine proceeds to step S4, at which objective function adjustment section 5i adjusts or updates the current objective function with weight $w_x$ determined in accordance with the equation (E13), and then proceeds to step S5. When the two objective functions are identical to each other, the routine proceeds directly to step S5, without the update step of step S4. At step S5, optimization section 5d finds the optimal correction value X*(t) with respect to the candidate solution U*(t−Δt). Subsequently, at step S6, abnormal solution detection section 5f determines whether or not the optimal solution including X*(t) and U*(t) is abnormal. When the answer to step S6 is affirmative (YES), the routine proceeds to step S7. On the other hand, when the answer to step S6 is negative (NO), the routine proceeds to step S10, without executing steps S7, S8, and S9. At step S7, abnormality handling section 5g discards the optimal correction value X*(t), the optimal solution U*(t), and the candidate solution U*(t−Δt). Subsequently, at step S8, abnormality handling section 5g replaces the current objective function stored in current objective function storage section 5c with the initial objective function. Subsequently, at step S9, initial solution generation section 5h generates the initial optimal solution in accordance with the initial objective function. Subsequently, at step S10, control input determination section 5e determines the current control input in accordance with the optimal solution U*(t), calculates the electric current needed to produce the control input, and send a control signal to the current control device accordingly. In the first cycle of the control in which there is no candidate solution, initial solution generation section 5h is initiated unconditionally to generate the initial optimal solution.

FIGS. 4A through 4D show how the system behaves in a situation where an abnormal solution is detected. The desired position is changed largely from A to −B at time $t_0$ in accordance with a command signal from control-command input device 7. At time $t_0$, at first, the control input is calculated to be below $-u_N$ which is the lower bound of the torque of motor 4, so that it is determined that the performed calculation is abnormal. Accordingly, weight $w_x$ is set to zero, to adjust the objective function to the initial objective function. In accordance with the initial objective function, the control input is determined to be zero at time $t_0$. As weight $w_x$ increases after time $t_0$, the control input increases so that the position of wheeled vehicle 3 is controlled to be −B.

Figure 5:
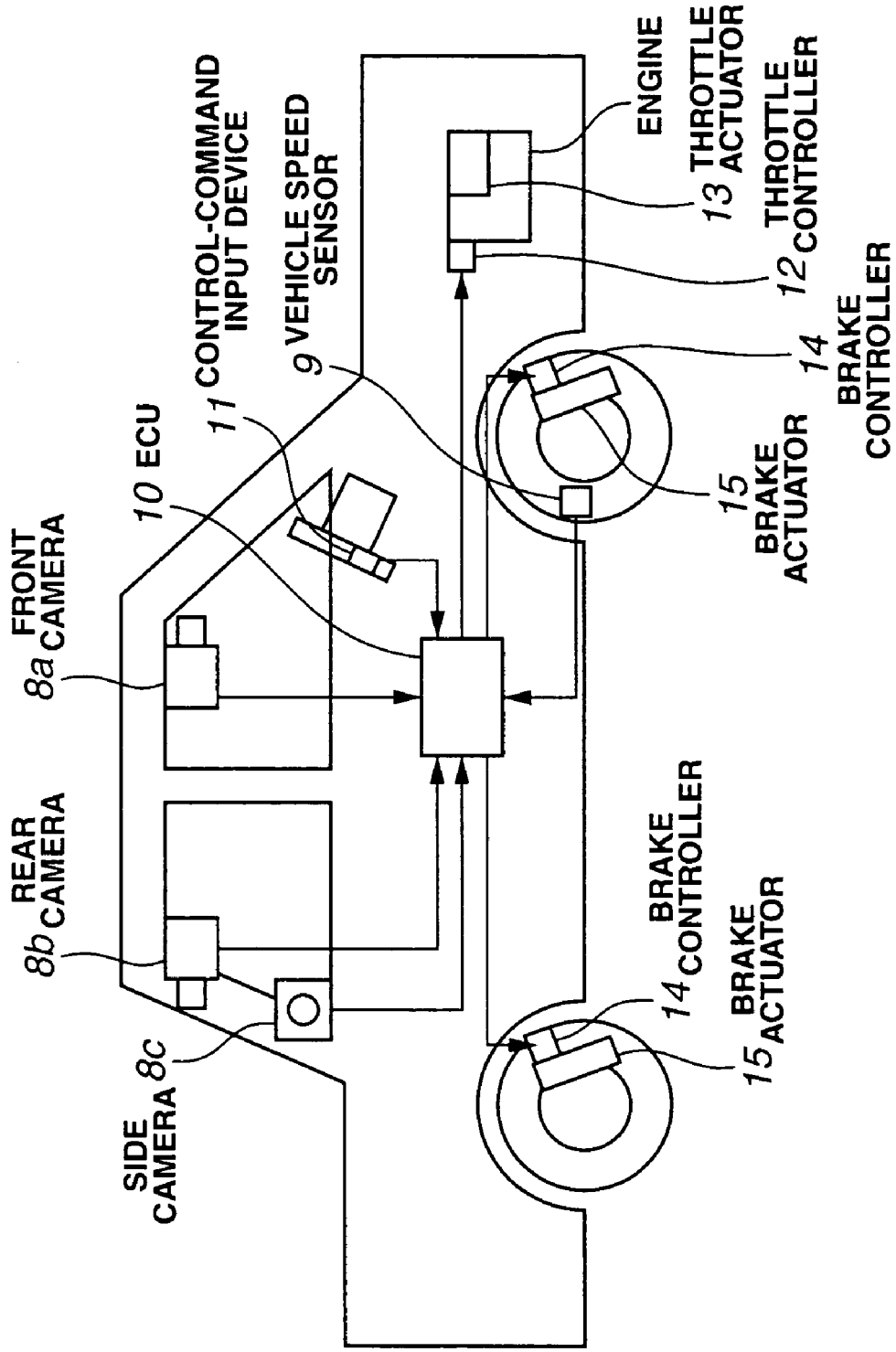
FIG. 5 is a schematic diagram of a model predictive control apparatus for an automotive vehicle in accordance with a second embodiment of the present invention.

Referring now to FIGS. 5 through 11F, there is shown a model predictive control apparatus for an automotive vehicle in accordance with a second embodiment of the present invention. FIG. 5 is a schematic diagram of the model predictive control apparatus. As shown in FIG. 5, the vehicle is equipped with an engine, cameras 8a, 8b, and 8c, a vehicle speed sensor 9, an electrical control unit (ECU) 10, a control-command input device 11, a throttle controller 12, a throttle actuator 13, brake controllers 14, and brake actuators 15. Front camera 8a includes a CCD camera, and mounted on the front portion of the vehicle to detect a plurality of target vehicles present in front of the vehicle, and to measure the positions of the target vehicles. In addition, front camera 8a is configured to monitor or recognize driving lanes of a road by detecting white marking lines on the road. Rear camera 8b is attached to the rear portion of the vehicle to detect a plurality of target vehicles present rearward of the vehicle, and to measure the positions of the target vehicles. Side camera 8c is mounted on each of the sides of the vehicle to detect a plurality of target vehicles present in a space that front camera 8a and rear camera 8b is disable to monitor, and to measure the positions of the target vehicles. Vehicle speed sensor 9 includes rotary encoder 6 mounted at a road wheel of the vehicle. Rotary encoder 6 generates periodical pulse signals whose period is determined in accordance with the rotational speed of the road wheel. Vehicle speed sensor 9 is configured to measure the vehicle speed in accordance with the periodical pulse signals.

Control-command input device 11 includes manually-operable switches disposed in the interior space of the vehicle. As the switches are manually operated by a driver, control-command input device 11 inputs the control objective or the setpoint of the system state such as the desired vehicle speed accordingly.

Throttle controller 12 is configured to receive from ECU 10 a control signal indicative of a desired driving torque, and to control the driving torque in accordance with the desired driving torque by means of throttle actuator 13. Throttle actuator 13 is configured to adjust the throttle valve to control the engine output torque. Brake controller 14 is configured to receive from ECU 10 a control signal indicative of a desired braking torque, and to control the braking torque in accordance with the desired braking torque by means of brake actuator 15. Brake actuator 15 is configured to adjust the brake apply pressure. As a whole, a wheel torque actuator including devices 12 to 15 is configured to adjust the wheel torque of host vehicle 16 as part or whole of the control input in accordance with an output signal from ECU 10.

ECU 10 includes a microcomputer, its peripheral devices, and a current control device. Specifically, ECU 10 includes an input/output interface (I/O), memories (RAM, ROM), and a microprocessor or a central processing unit (CPU). The input/output interface (I/O) of ECU 10 receives input information from sensors, namely, vehicle speed sensor 9, and cameras 8a through 8c, and from control-command input device 11. Within ECU 10, the central processing unit (CPU) allows the access by the I/O interface of input informational data signals from the sensors. The CPU of ECU 10 is responsible for carrying out the control program stored in the memories and is capable of performing necessary arithmetic and logic operations. Computational results, that is, calculated output signals are relayed through the output interface circuitry of ECU 10 to output stages, throttle controller 12, and brake controller 14, through the current control device. Thus, ECU 10 is configured to receive control signals from vehicle speed sensor 9 and control-command input device 11, to process the control signals using the program stored in its internal memory, and to output a control command to throttle controller 12 and brake controller 14 accordingly.

Figure 6:
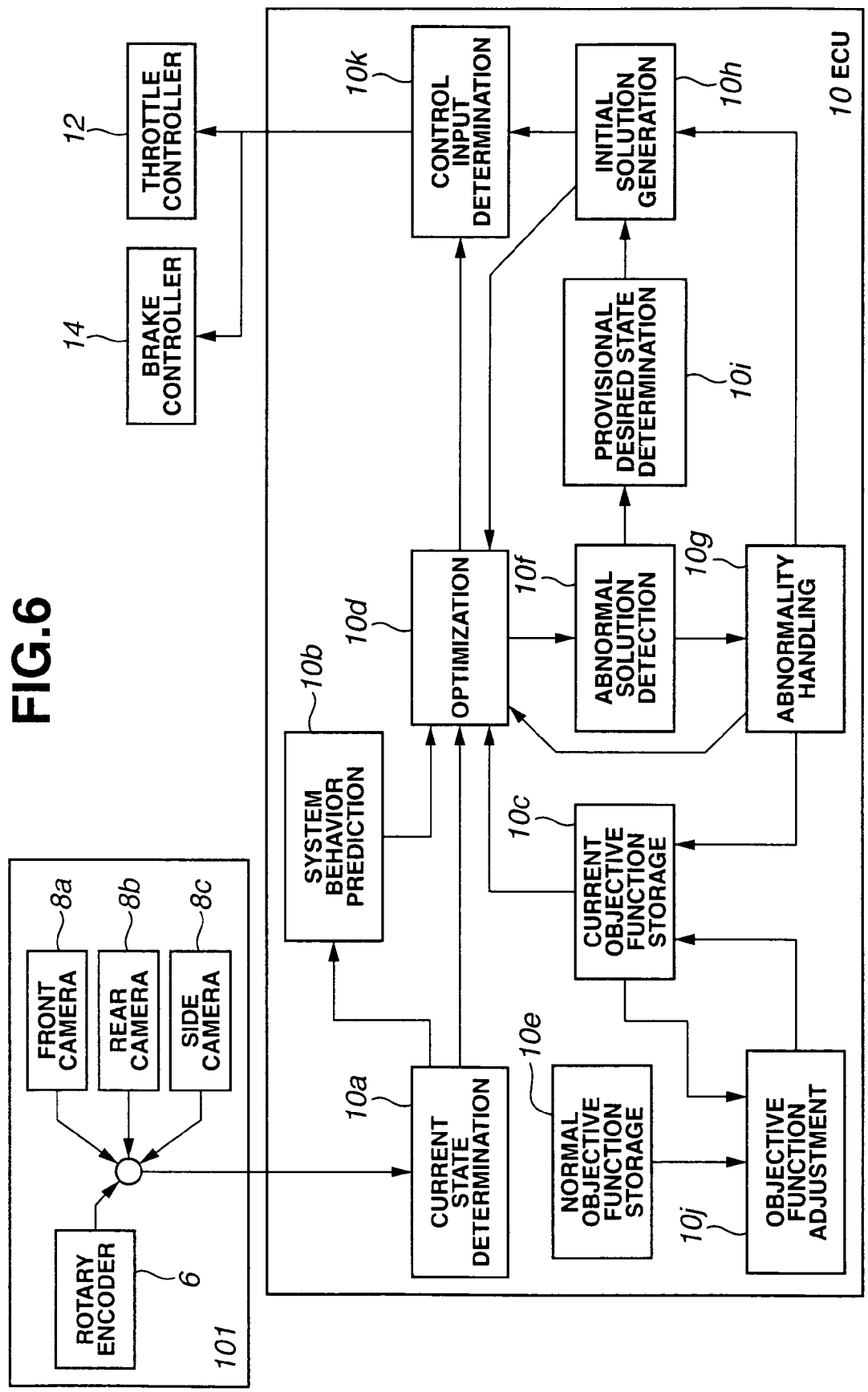
FIG. 6 is a functional block diagram of an ECU of the model predictive control apparatus in accordance with the second embodiment of the present invention.

FIG. 6 shows blocks indicative of software modules or functional sections 10a through 10k of the program stored in ECU 10. Thus, ECU 10 is equipped with an algorithm base on the model predictive control. As in the above-mentioned first embodiment, the model predictive control apparatus is configured to predict a time series of a state of a system in accordance with a mathematical model of the system, to define an objective function to numerically evaluate the predicted future time series system state and a future time series of a control input to force the system state to track its setpoint, to calculate an optimal value of the future time series control input which minimizes the objective function, and to input the calculated value of the control input to the system. In the second embodiment, the system state includes the positions and the speeds along a road or the direction of travel, and the positions in the lateral direction, of the host vehicle and the target vehicles.

Figure 7:
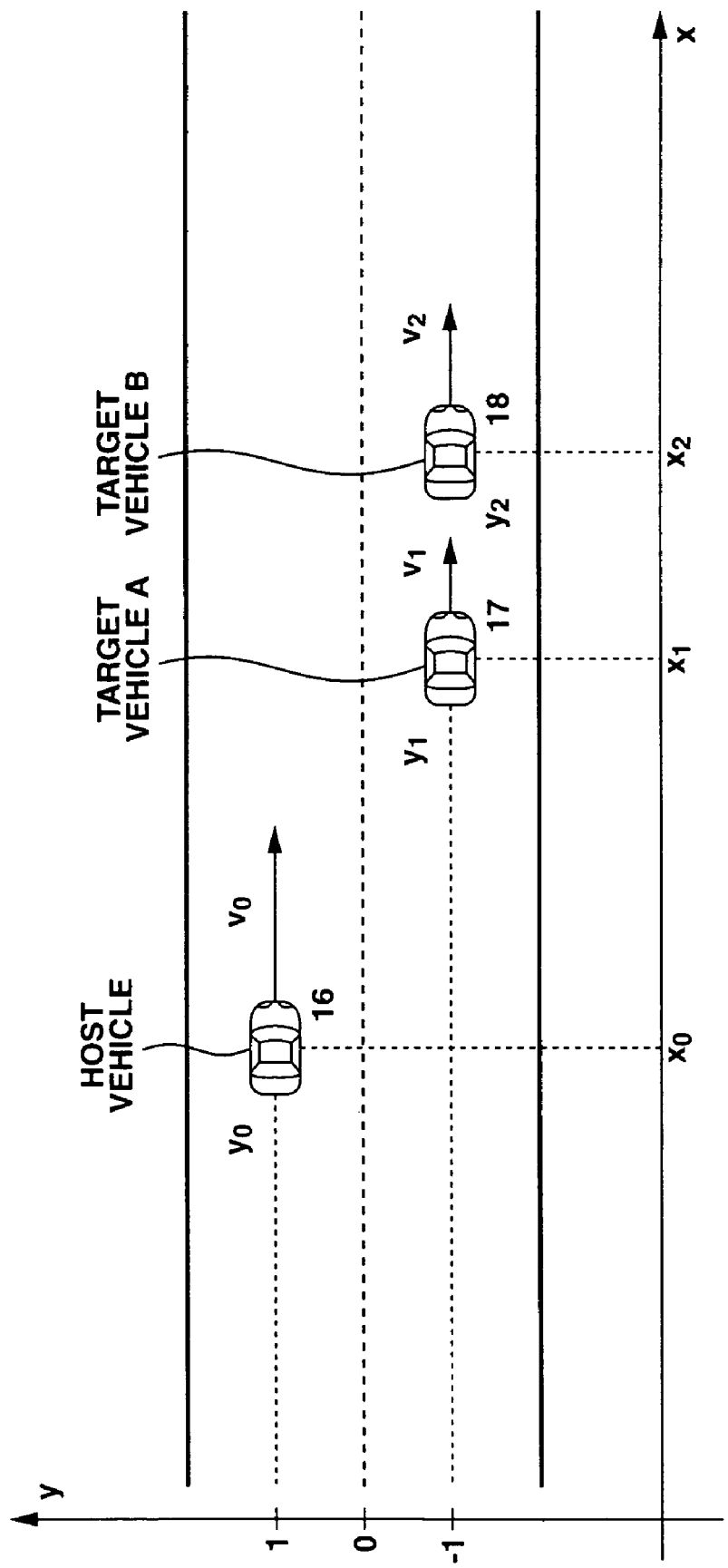
FIG. 7 is a schematic diagram depicting a coordinate system to be used in the second embodiment of the present invention.
Figure 8:
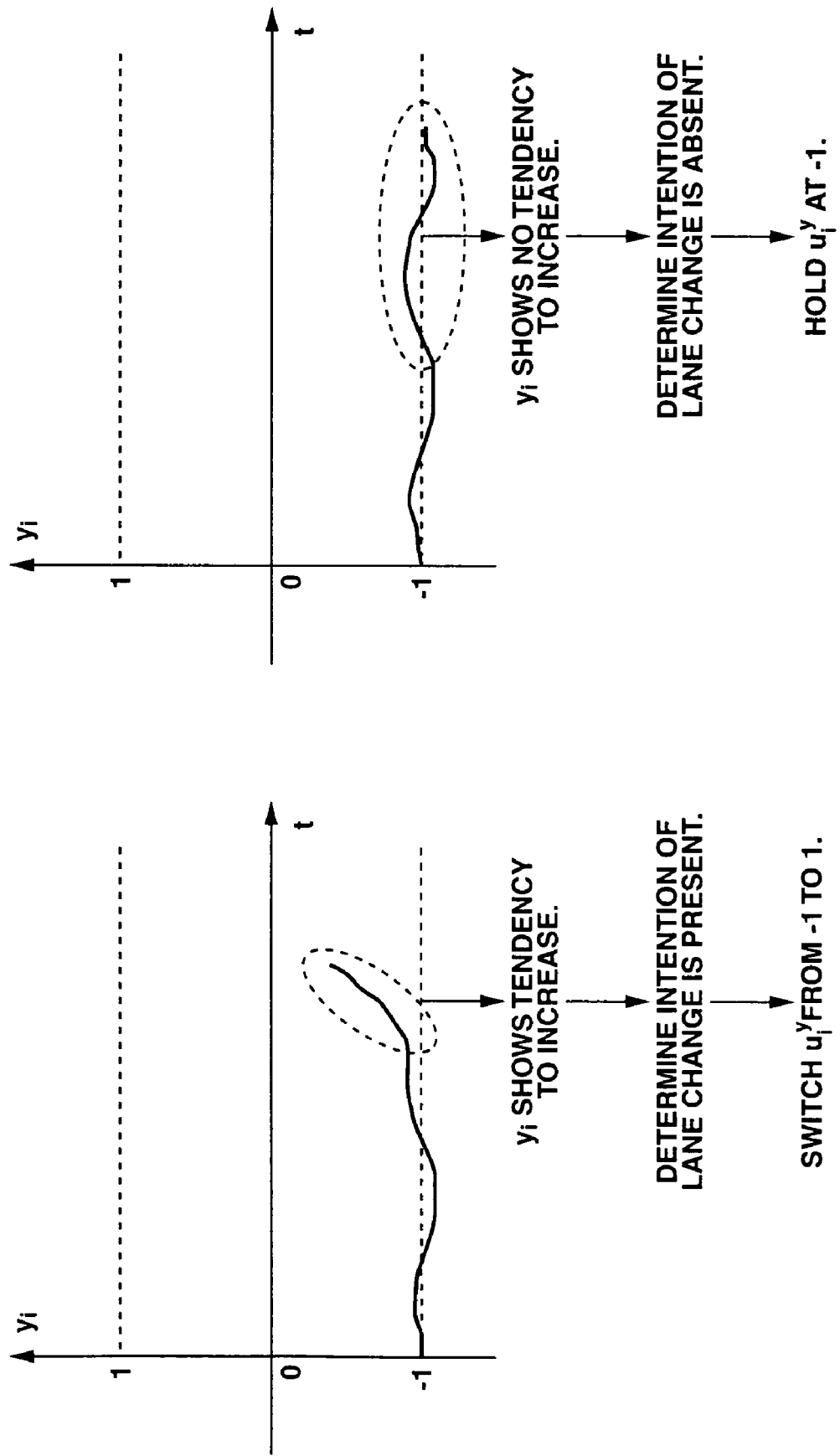
FIGS. 8A and 8B illustrate how the model predictive control apparatus in accordance with the second embodiment of the present invention predicts the dynamic behaviors of target vehicles around the host vehicle.
Figure 9:
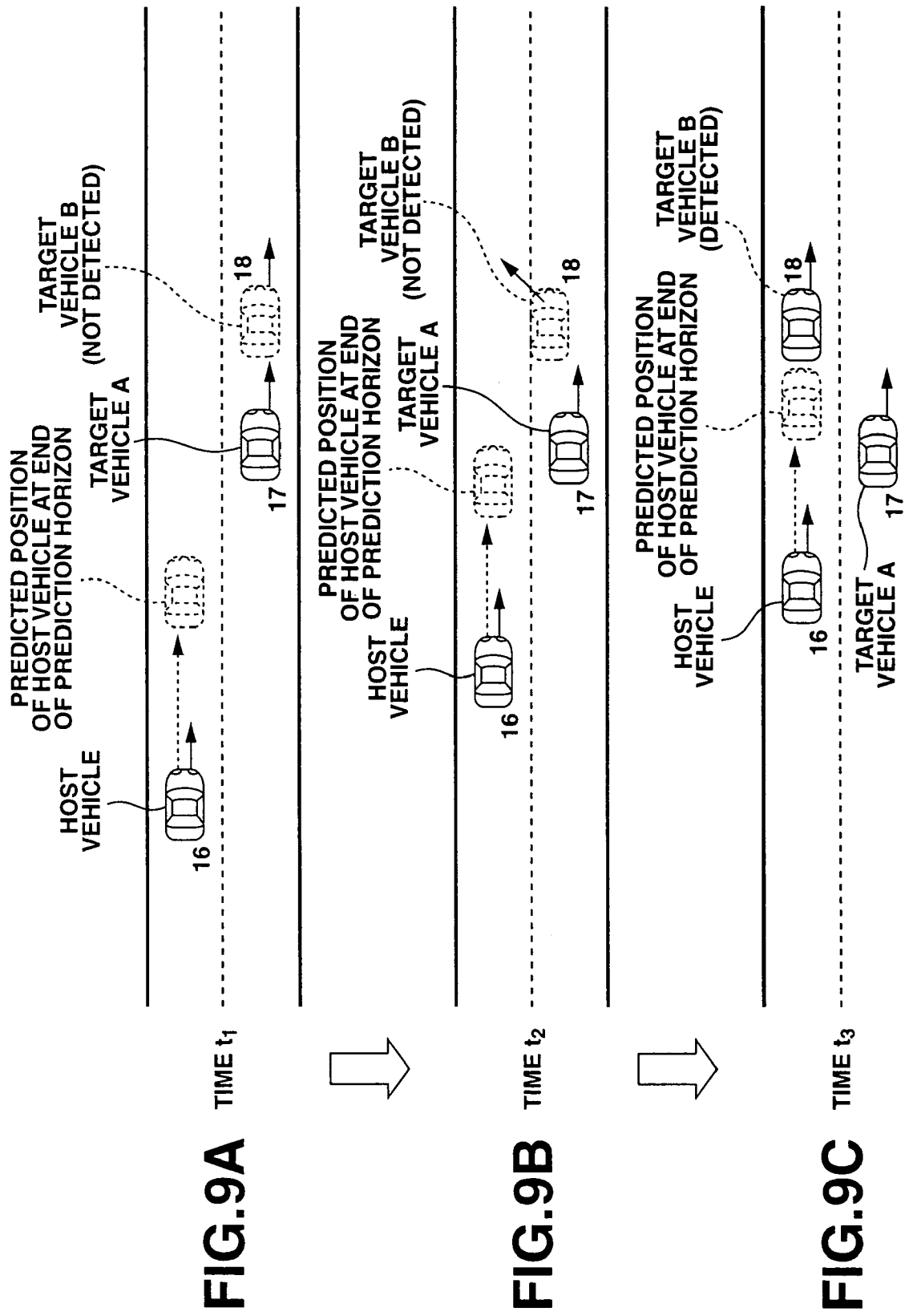
FIGS. 9A through 9C illustrate how the model predictive control apparatus in accordance with the second embodiment of the present invention operates in a sample case.

FIG. 7 shows a coordinate system for mathematical modeling in the shown embodiment. In FIG. 7, host vehicle 16, two target vehicles, i.e., target vehicle A 17, and target vehicle B 18 are present or traveling on a two-lane one-way road (a four-lane road). The x-axis is defined to extend along the road, and the y-axis is defined to extend normal to the x-axis in the horizontal plane. The zero point of the x-axis may be located at any point, because the relative distances between host vehicle 16 and target vehicle A 17 and between host vehicle 16 and target vehicle B 18 are used in the actual control computation. The zero point of the y-axis is located at the lane-marking line which divides between the left lane and the right lane. The scale of the y-axis is normalized so that the y-coordinate of the center line of the left lane is 1, and the y-coordinate of the center line of the right lane is −1. Host vehicle 16, target vehicle A 17, and target vehicle B 18 are given denotations "0", "1", and "2", respectively. More specifically, the x-position, the longitudinal speed, the y-position, of each of the vehicles concerned are represented by $x_i$, $v_i$, and $y_i$ (i=0, 1, 2) respectively. Accordingly, when two target vehicles are detected as in the shown embodiment, the system state x is described by the following equation (E14).

$$x = (x_0\ v_0\ y_0\ x_1\ v_1\ y_2\ x_2\ v_2\ y_2) \quad (E14)$$

As shown in FIG. 6, a sensing section 101 includes front camera 8a, rear camera 8b, side cameras 8c, and vehicle speed sensor 9 (rotary encoder 6), to detect target vehicles present around host vehicle 16, and to measure the state of the physical system including host vehicle 16 and the target vehicles, and is connected electrically to ECU 10 to output the sensing signals to current state determination section 10a of ECU 10. ECU 10 determines the measured value of each element of the system state in the equation (E14), in accordance with the signals from the sensing section 101.

System behavior prediction section 10b is configured to predict a future time series of the system state over a prediction horizon of time in accordance with the measured system state, and a future time series of a control input to the host vehicle over a control horizon of time. In order to predict each of the future behaviors of the vehicles concerned, a mathematical prediction model is constructed. The mathematical prediction models of the vehicles concerned are combined together to produce an integrated mathematical prediction model in the form of the equation (E3) which predicts all the future behaviors of the vehicles concerned. The behavior prediction model of the host vehicle 16 is described by the following equation (E15).

$$\dot{x}_0 = v_0$$
$$\dot{v}_0 = u$$
$$\dot{y}_0 = 0 \quad (E15)$$

where u is the acceleration (or deceleration) of host vehicle along the x-axis, which is the control input to be optimized. A variable accompanied with an upper dot represents its time derivative. In the shown embodiment, the model predictive control apparatus is targeted only to the motion of host vehicle 16 along the x-axis. Accordingly, the equation concerning $\dot{y}_0$ includes no lateral element of the control input. Assuming that host vehicle 16 keeps traveling in the current driving lane, $\dot{y}_0 = 0$ is given.

On the other hand, each of the behavior prediction models of target vehicles A 17 and B 18 is described by the following equation (E16).

$$\dot{x}_i = v_i$$
$$\dot{v}_i = \omega_i^v v_i + \omega_i^v v_i^{com}$$
$$\dot{y}_i = -\omega_i^y y_i + \omega_i^y u_i^y \quad (E16)$$

where $\omega_i^v$, and $\omega_i^y$ are positive constant values indicative of quickness of speed adjustment, and quickness of lane change, of target vehicle i (i=1, 2), respectively, $v_i^{com}$ is a desired vehicle speed of target vehicle i, and $u_i^y$ is the lane position of target vehicle i.

The desired speed $v_i^{com}$ in the equation (E16) is modeled by the following equation (E17).

$$v_i^{com} = \begin{cases} v_i^* & \cdots \text{ (no preceding vehicle)} \\ v_i^f(x_i^p - x_i, v_i^p - v_i, v_i) & \cdots \text{ (preceding vehicle present)} \end{cases} \quad (E17)$$

where $v_i^*$ is an estimated desired vehicle speed of target vehicle i during there is no vehicle preceding target vehicle i, $v_i^f(R_i, R_i', v_i)$ is a model function which indicates a desired vehicle speed of target vehicle i in a condition in which the relative distance and the relative speed with respect to the preceding vehicle are $R_i$, and $R_i'$, respectively, and the vehicle speed is $v_i$. This function may be implemented by an algorithm including the equations (2) through (8), and the tables (1) and (2), in a Published Japanese Patent Application No. 2000-135934. The entire contents of this Japanese Patent Application No. 2000-135934 are hereby incorporated by reference. $x_i^p$, and $v_i^p$ are the position and speed of the preceding vehicle in the same lane as target vehicle i. In FIG. 7, the preceding vehicle for target vehicle A 17 is target vehicle B 18. Accordingly, $x_i^p = x_2$, and $v_i^p = v_2$. Host vehicle 16 and target vehicle B 18 both have no preceding vehicle, so that the variables $x_i^p$, and $v_i^p$ for them are not defined.

System behavior prediction section 10b is configured to predict a future time series state of the target vehicle as part of the future time series system state in accordance with the time series measured system state. Desired lane position $u_i^y$ is set to −1 or 1 in accordance with prediction about whether target vehicle i (i.e. target vehicle A 17 or target vehicle B 18) keeps traveling in its current lane or is going to shift to the adjacent lane. The prediction is based on a past time series of lane position $y_i$. FIGS. 8A and 8B illustrate how the model predictive control apparatus predicts the dynamic behaviors of target vehicles around the host vehicle. When lane position $y_i$ tends to increase as shown in FIG. 8A, it is determined that target vehicle i has intention of lane change to the left driving lane. Accordingly, the desired lane position $u_i^y$ is switched from −1 to 1. When lane position $y_i$ has no tendency as shown in FIG. 8B, it is determined that target vehicle i has no intention of lane change to the left driving lane. Accordingly, the desired lane position $u_i^y$ is held at −1. Thus, system behavior prediction section 10b is configured to construct the prediction models of host vehicle 16, and target vehicles A 17 and B 18.

The objective function is described in the form of the equation (E4), as in the first embodiment. The instantaneous objective function L is constructed so as to express criteria concerning a desired behavior of the host vehicle. In this embodiment, the instantaneous objective function L includes terms concerning the following three criteria.

(Criterion CR1) The host vehicle is desired to travel at a speed as close to the desired speed as possible.
(Criterion CR2) The host vehicle is desired to accelerate at as small an acceleration as possible.
(Criterion CR3) The host vehicle is desired not to be too close to target vehicles.

The term concerning criterion CR1 is described by the following equation (E18).

$$L_v(v_0) = W_v/2 (v_0 - v_D^*)^2 \quad (E18)$$

where $w_v$ is a positive constant value indicative of a weight for criterion CR1 in the instantaneous objective function L. $v_0^*$ is set to the desired speed of host vehicle 16 which is input by control-command input device 11.

The term concerning criterion CR2 is described by the following equation (E19).

$$L_u(u) = W_u/2 \, u^2 \quad (E19)$$

where $w_u$ is a positive constant value indicative of a weight for criterion CR2 in the instantaneous objective function L.

In order to mathematically express criterion CR3, a degree of close approach to target vehicles A 17 and B 18, (a collision risk degree, or a contact risk degree), is evaluated by an indicator. Headway time (=following distance/following-vehicle speed) or time to collision (=following distance/relative speed) is available as an indicator. Accordingly, the term concerning criterion CR3 is configured to include reciprocals of the headway time and the time to collision, so that the term decreases with increasing degree of desirability of the behavior. The term concerning a vehicle preceding to host vehicle 16 in the same driving lane is described by the following equation (E20). The term concerning a vehicle following host vehicle 16 in the same driving lane is described by the following equation (E21).

$$L_f(x_f, v_f) = \lambda \cdot \frac{v_0}{x_f - x_0} + (1-\lambda) \cdot \frac{v_0 - v_f}{x_f - x_0} \cdot \frac{1}{1 + \exp(-k_s(v_0 - v_f))} \quad (E20)$$

$$L_r(x_r, v_r) = \lambda \cdot \frac{v_r}{x_0 - x_r} + (1-\lambda) \cdot \frac{v_r - v_0}{x_0 - x_r} \cdot \frac{1}{1 + \exp(-k_s(v_r - v_0))} \quad (E21)$$

where $x_f$ and $v_f$ are the position and the speed of the preceding vehicle, respectively, $x_r$, and $v_r$ are the position and the speed of the following vehicle, λ is a constant value in a range from 0 to 1 which adjusts weights between the headway time and the time to collision, and $k_s$ is a positive constant value as a parameter to determine the shape of a saturation term which is provided to make the term bounded below.

In the situation as shown in FIG. 7, target vehicles A 17 and B 18 are both the preceding vehicles with respect to host vehicle 16. When target vehicles A 17 and B 18 are present in the right driving lane, the collision risk degrees concerning target vehicles A 17 and B 18 are both evaluated to be zero. When one or both of the target vehicles are about to perform lane change to the left driving lane, the collision risk degree is evaluated. The collision risk degree is evaluated with respect to one of the target vehicles which is the nearest to host vehicle 16. Accordingly, when both of target vehicles A 17 and B 18 are going to perform lane change to the left driving lane, only the collision risk degree concerning target vehicle A 17 is determined. Therefore, the term concerning criterion CR3 is described by the following equation (E22).

$$L_s(x) = c_L(y_1) \cdot w_1 \cdot L_f(x_1, v_1) + c_L(y_2) \cdot c_R(y_1) \cdot w_2 \cdot L_f(x_2, v_2) \quad (E22)$$

where $w_1$ and $w_2$ are positive constant values indicating weights for target vehicles A 17 and B 18, respectively, and $c_L(y)$ and $c_R(y)$ are functions described by the following equations (E23) and (E24), respectively.

$$c_L(y) = \begin{cases} 0 & \cdots & \left(y < -\frac{1}{2}\right) \\ \frac{1}{2} + \frac{1}{2}\sin(n \cdot y) & \cdots & \left(-\frac{1}{2} \leq y \leq \frac{1}{2}\right) \\ 1 & \cdots & \left(\frac{1}{2} < y\right) \end{cases} \quad \text{(E23)}$$

$$c_R(y) = \begin{cases} 1 & \cdots & \left(y < -\frac{1}{2}\right) \\ \frac{1}{2} - \frac{1}{2}\sin(n \cdot y) & \cdots & \left(-\frac{1}{2} \leq y \leq \frac{1}{2}\right) \\ 0 & \cdots & \left(\frac{1}{2} < y\right) \end{cases} \quad \text{(E24)}$$

Finally, the instantaneous objective function L is described by the following equation (E25) which is the sum of the equations (E18), (E19), and (E22).

$$L(x,u) = L_v(v_0) + L_u(u) + L_s(x) \quad \text{(E25)}$$

This instantaneous objective function L is used to calculate the optimal control input. As in the first embodiment, the normal objective function is stored in normal objective function storage section 10e. Current objective function storage section 10c is configured to store the current objective function which is the normal objective function or an adjusted objective function. Actually, the objective function reference group including current objective function storage section 10c and normal objective function storage section 10e stores and provides a normal value of the function definition data defining the normal objective function, an initial value of the function definition data defining the initial objective function, and a current value of the function definition data defining the current objective function. Optimization section 10d is configured to read the objective function from current objective function storage section 10c, and performs optimization calculation. Optimization section 10d is configured to operate as in the first embodiment, except that it uses the different system model and the different objective function.

Abnormal solution detection section 10f is configured to determine whether or not the performed optimization calculation is abnormal, in accordance with criteria. The criteria include the three criteria listed in the first embodiment, and additional criteria characteristic of the vehicle dynamics control as mentioned below.

FIGS. 9A through 9C illustrate how the model predictive control apparatus operates in a sample situation in which an abnormal solution is detected. In FIG. 9A, host vehicle 16 and two target vehicles A 17 and B 18 are traveling on a two-lane one-way road. Host vehicle 16 is traveling in the left lane, and is going to pass through target vehicles A 17 and B 18 which are both traveling in the right lane. In this situation, it is significant that target vehicle B 18 is close to target vehicle A 17 to prevent front camera 8a mounted on host vehicle 16 from detecting target vehicle B 18. At time $t_1$, target vehicles A 17 and B 18 are not divided on the image of front camera 8a so that target vehicle B 18 is not detected. In this situation, the model predictive control apparatus of host vehicle 16 determines the optimal value of the control input in accordance with the prediction of the behavior of target vehicle A 17, without consideration of target vehicle B 18. If target vehicle B 18 begins to perform lane change to the left lane at time $t_2$ as shown in FIG. 9B after the situation as shown in FIG. 9A, front camera 8a of host vehicle 16 detects target vehicle B 18 at time $t_3$ after target vehicle B 18 begins to enter the left lane.

The model predictive control apparatus recognizes that target vehicle B 18 suddenly appears, so that there is a large gap between the predicted system state and the actual state system.

As discussed in the first embodiment, in the model predictive control system, when a large disturbance is input to the system to generate a large deviation between the predicted system state and the actual system state, or when the objective function varies largely, the assumption that the difference between the immediately preceding optimal solution and the current optimal solution is small does not hold, to adversely affect the accuracy of the linearity approximation of nonlinear terms in converting the original nonlinear optimization problem to the system of simultaneous first order equations. Therefore it is possible that the abnormality conditions are satisfied in such cases. In the situation as shown in FIGS. 9A through 9C, when target vehicle B 18 is detected, the candidate solution which was the optimal solution in the immediately preceding control cycle becomes a solution with which host vehicle 16 is traveling close to target vehicle B 18. Accordingly, the candidate solution is largely different from the actual current optimal solution. In addition, the collision risk degree is evaluated by the equation (E20). As host vehicle 16 approaches close to target vehicles, the objective function and the gradient of the objective function becomes large. Therefore, it is possible that the numerical condition is adversely affected accordingly.

In order to construct the system of simultaneous first order equations (E9), the equation (E3) is integrated using the following equation (E26) and the candidate solution $U^*(t-\Delta t)$.

$$x_0 = x(t)$$

$$x_{i+1} = x_i + f(x_i, U_i^*(t-\Delta t)) \cdot T/N \;\; (i=0, 1, \ldots, N-1) \quad \text{(E26)}$$

where $U_i^*(t-\Delta t)$ is the ith element of the candidate solution $U^*(t-\Delta t)$. Checking the predicted values of the system state $x_0, x_1,$ through $x_N$, ECU 10 detects whether the numerical condition is ill to adversely affect the control. In the situation of FIGS. 9A through 9C, the close approach to target vehicle B 18 is significant. Accordingly, the abnormality condition includes an additional criterion which is described by the following equation (E28) with the predicted system state $x_i$ described by the equation (E27).

$$x_i = (\hat{x}_0(i)\hat{v}_0(i)\hat{y}_0(i)\hat{x}_1(i)\hat{v}_1(i)\hat{y}_1(i)\hat{x}_2(i)\hat{v}_2(i)\hat{y}_2(i)) \quad \text{(E27)}$$

$$\hat{\tilde{x}}_2(i) - \hat{x}_0(i) \leq R_f \quad \text{(E28)}$$

$$\hat{\tilde{x}}_2(i) = c_L(\hat{y}_2(i)) \cdot (\hat{x}_0(i) + R_0) + c_R(\hat{y}_2(i)) \cdot \hat{x}_2(i) \quad \text{(E29)}$$

where $R_0$ is a positive constant value larger than detection horizon of front camera 8a. $R_f$ in the equation (E28) is a positive constant value as a threshold value used to detect the abnormal solution.

$$\hat{\tilde{x}}_2(i)$$

defined by the equation (E29) is the position of target vehicle B 18 which is corrected in accordance with its lane position. As shown in the equation (E28), when the distance from host vehicle 16 to target vehicle B 18 is smaller than or equal to $R_f$, it is determined that the solution is abnormal. Thus, abnormal solution detection section 10f is configured to determine a degree of risk of contact between the host vehicle and the target vehicle in accordance with the system state, and to determine that the performed optimization is abnormal when the optimal predicted value of the time series system state includes an abnormal future value of the system state whose risk degree is at or above a certain threshold level.

Abnormality handling section 10g is configured to discard the calculated optimal solution U*(t) and the candidate solution U*(t−Δt), and to generate and store the initial objective function in current objective function storage section 10c so that initial solution generation section 10h easily generates the initial optimal solution.

Initial solution generation section 10h is configured to generate the initial solution in accordance with the initial objective function which is constructed setting weights $w_1$ and $w_2$ to zero in the objective function (E25). The optimal solution for the initial objective function with weights $w_1$ and $w_2$ being zero is expressed by an elementary function. Specifically, the optimal solution is described by the following equation (E30) with k defined by the equation (E31).

$$u^*(t'; t) = \\ k \cdot (v_0^* - v_0(t)) \cdot \cosh(k \cdot (t' - t)) \cdot \{\tanh(k \cdot T) - \tanh(k \cdot (t' - t))\} \quad (E30)$$

$$k = \sqrt{\frac{w_v}{w_u}} \quad (E31)$$

When the equation (E28) is unsatisfied, or when the performed calculation is not abnormal, u*(t';t) is calculated at t'=t+i(T/N) (i=0, 1, through N−1) with $v_0(t)$ set to the current host vehicle speed in accordance with the equation (E30). Thus, the optimal solution U*(t) is determined. On the other hand, when the equation (E28) is satisfied, that is, when the solution is abnormal, provisional desired state determination section 10i generates a provisional desired state so that the equation (E28) is unsatisfied with a revised initial solution which is determined with the provisional desired state explicitly determined at the end of the prediction horizon. Suppose the equation (E28) is satisfied at integration step i=$i_f$ of the equation (E26). When the equation (E28) is satisfied, abnormal solution detection section 10f stores the value of i and the system state $x_{i_f}$. Provisional desired state $i_f$ determination section 10i determines the provisional desired system state at time t'=t+$T_f$ ($T_f$=$i_f$(T/N)). The provisional desired system state is calculated using the following equation (E32).

$$x_0(t+T_f) \leq x_0^{tmp}$$

$$v_0(t+T_f) \leq v_0^{tmp} \quad (E32)$$

where $x_0^{tmp}$ and $v_0^{tmp}$ are calculated using the following equation (E33).

$$x_0^{tmp} = \hat{x}_0(i_f) - R_f - R_m$$

$$v_0^{tmp} = \hat{v}_0(i_r) - v_m \quad (E33)$$

where $R_m$ and $v_m$ are positive constant values. According to the equations (E32) and (E33), the desired position of host vehicle 16 is set so that the headway to target vehicle A 17 is larger than or equal to $R_f$+$R_m$, and the desired speed of host vehicle 16 is set smaller than the speed of target vehicle B 18 so that the difference between the desired speed and the speed of target vehicle B 18 is larger than or equal to $v_m$.

As provisional desired state determination section 10i determines the provisional desired system state base on the equation (E32), initial solution generation section 10h adjusts the initial objective function so that the optimal predicted system state for the adjusted objective function includes the provisional desired system state at time t'=t+$T_f$. In order to provide the initial optimal solution which is comprised of an elementary function, $w_1$ and $w_2$ are both set to zero, and horizon T is replaced with $T_f$ in the equation (E25). The optimal solution for the adjusted objective function is obtained replacing T with $T_f$ in the equation (E30). With this optimal solution, the state of host vehicle 16 at t'=t+$T_f$ is calculated using the following equations (E34) and (E35).

$$x_0(t+T_f) = v_0^* \cdot T_f - (v_0^* - v_0(t)) \cdot \frac{\tanh(k \cdot T_f)}{k} \quad (E34)$$

$$v_0(t+T_f) = v_0^* + (v_0(t) - v_0^*) \cdot \frac{1}{\cosh(k \cdot T_f)} \quad (E35)$$

In order to satisfy the equation (E32), the desired vehicle speed $v_0^*$ is temporally set to a value different from the driver's setpoint manually adjusted. More specifically, the desired vehicle speed $\bar{v}_{0^*}$ that satisfies the equation (E32) concerning both x and v is calculated using the following equation (E36).

$$\bar{v}_0^* = \min\left(\frac{kx_0^{tmp} - \tanh(k \cdot T_f)}{k \cdot T_f - \tanh(k \cdot T_f)}, \frac{v_0^{tmp} \cdot \cosh(k \cdot T_f) - v_0(t)}{\cosh(k \cdot T_f) - 1}\right) \quad (E36)$$

Therefore, initial solution generation section 10h outputs the initial optimal solution calculated by the following equations (E37) and (E38).

$$u^*(t'; t) = k \cdot (\bar{v}_0^* - v_0(t)) \cdot \cosh(k \cdot (t' - t)) \cdot \quad (E37)$$

$$\{\tanh(k \cdot T_f) - \tanh(k \cdot (t' - t))\}$$

$$U^*(t) = \left[u^*(t; t)u^*\left(t + \frac{T_f}{N}; t\right) \cdots u^*\left(t + \frac{N-1}{N}T_f; t\right)\right] \quad (E38)$$

Thus, initial solution generation section 10h is configured to provide an explicit function definition data value defining an explicit function to provide the optimal value of the time series control input in accordance with the initial objective function, and to calculate the optimal value of the time series control input in accordance with the explicit function definition data value when it is determined that the current function definition data value is identical to the initial function definition data value.

Accordingly, abnormality handling section 10g is configured to replace the current objective function with the following initial objective function (E39).

$$J[u(t'; t)] = \int_t^{t+T_f}\left(\frac{w_v}{2}(v_0(t') - \bar{v}_0^*)^2 + \frac{w_u}{2}u(t')^2\right)dt' \quad (E39)$$

Subsequently, ECU 10 terminates the abnormality handling.

After the abnormality handling, the current objective function is not identical to the normal objective function. Therefore, objective function adjustment section 10*j* is configured to adjust the current objective function. If the prediction horizon is reduced in the abnormality handling, objective function adjustment section 10*j* gradually adjusts or increases the horizon toward the normal value T. Horizon T(t) at time t is adjusted in accordance with an update law described by the following equation (E40) so that horizon T(t) varies stepwise with time toward the normal value.

$$T(t) = T(t-\Delta t) + \alpha \cdot (T - T(t-\Delta t)) \tag{E40}$$

If weights $w_1$ and $w_2$ are set to zero in the immediately preceding abnormality handling, weights $w_1$ and $w_2$ are adjusted in accordance with an update law described by the following equation (E41) so that weights $w_1$ and $w_2$ vary stepwise with time toward the normal values.

$$w_i(t) = w_i(t-\Delta t) + \alpha \cdot (w_i - w_i(t-\Delta t)) \ (i=1, 2) \tag{E41}$$

If the desired vehicle speed is changed in the immediately preceding abnormality handling, the term of the objective function as to host vehicle 16 are adjusted in accordance with an update law described by the following equations (E42) and (E43) so that the current objective function varies toward the normal objective function.

$$L_v(V_0(t)) = w_v/2(\beta(t) \cdot (v_0(t)-v_0^*)^2 + (1-\beta(t)) \cdot (v_0(t)-\bar{v}_0^*)^2) \tag{E42}$$

$$\beta(t) = \beta(t-\Delta t) + \alpha \cdot (T - \beta(t-\Delta t)) \tag{E43}$$

Specifically, abnormality handling section 10*g* is configured to adjust the current function definition data value so that a current value of a length of the prediction horizon decreases from a normal value of a length of the prediction horizon so that the optimization is held normal, when it is determined that the performed optimization is abnormal. Objective function adjustment section 10*j* is configured to adjust the current function definition data value so that the current value of the prediction horizon length varies stepwise with time toward the normal value of the prediction horizon length, when the current value of the prediction horizon length is different from the normal value of the prediction horizon length.

Finally, control input determination section 10*k* determines the control input to be the first element u*(t;t) of the optimal solution U*(t), and sends the control command to throttle controller 12 or brake controller 14 accordingly, as in the first embodiment.

Figure 10:
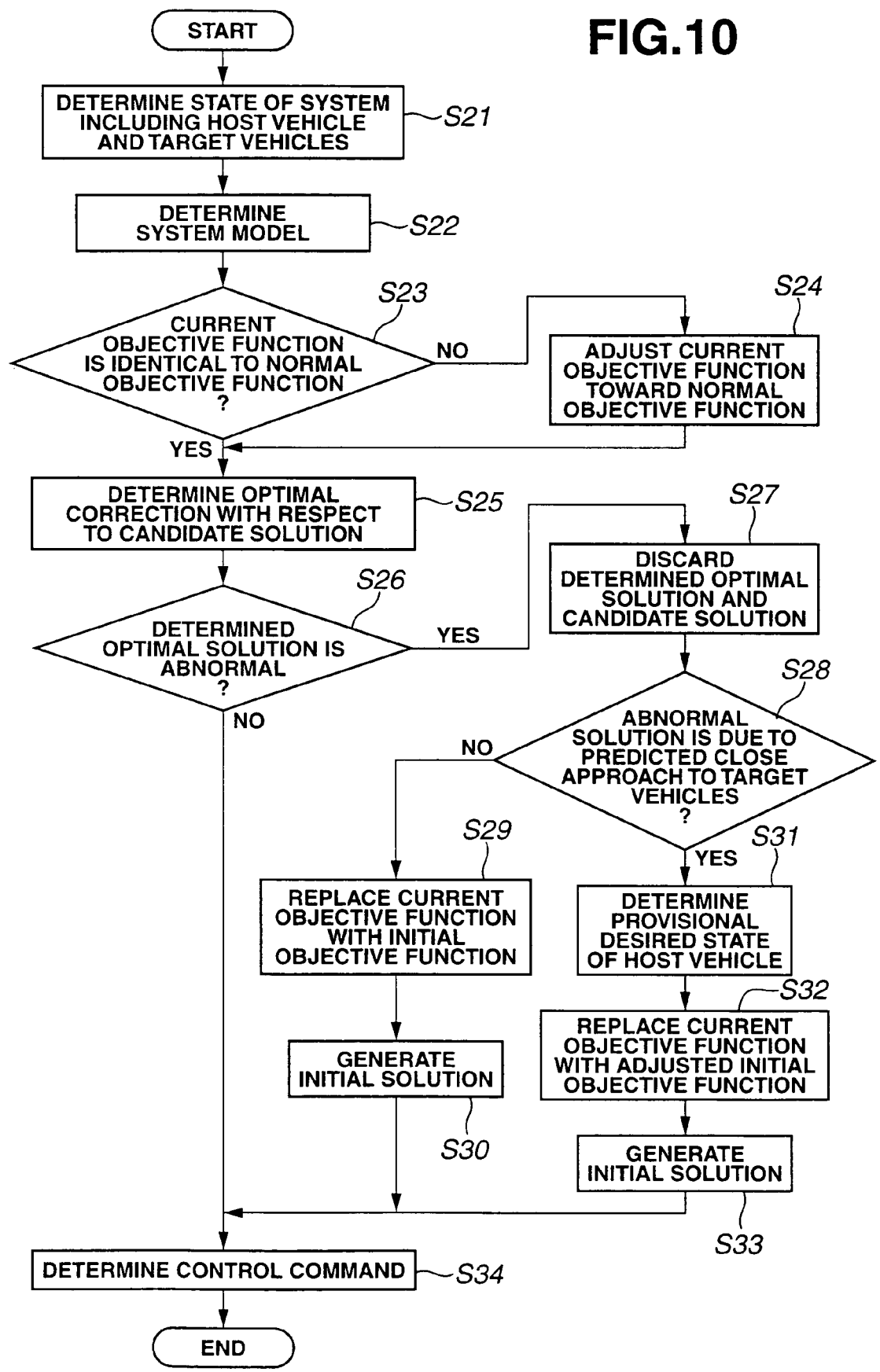
FIG. 10 is a flow chart depicting a routine to be executed by the ECU in accordance with the second embodiment of the present invention.
Figure 11:
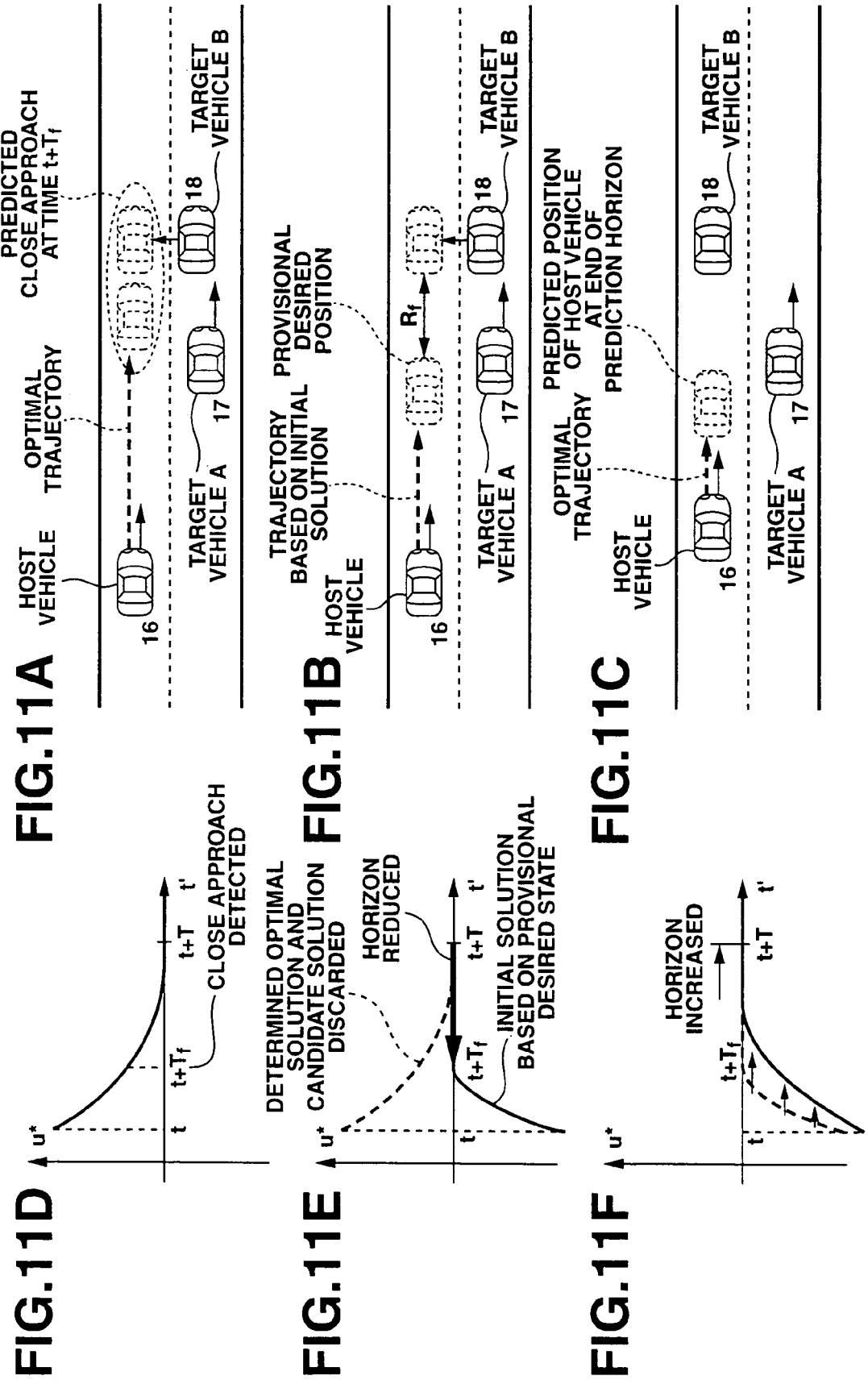
FIGS. 11A through 11F illustrate how the model predictive control apparatus in accordance with the second embodiment of the present invention operates in a sample case in which an abnormal solution is detected.

FIG. 10 is a flow chart depicting the above-mentioned routine to be executed by ECU 10 of the model predictive control apparatus. First, at step S21, current state determination section 10*a* reads the sensing signal from sensing section 101, and determines the current state of the system x(t) including host vehicle 16, target vehicle A 17, and target vehicle B 18. Subsequently, at step S22, optimization section 10*d* reads the data concerning the system model stored in system behavior prediction section 10*b*, and determines the parameters in accordance with the system condition. Subsequently, at step S23, objective function adjustment section 10*j* compares the normal objective function stored in normal objective function storage section 10*e* and the current objective function stored in current objective function storage section 10*c*. When the two objective functions are different from each other, the routine proceeds to step S24, at which objective function adjustment section 10*j* adjusts the current objective function toward the normal objective function in accordance with the equations (E40) through (E43), and then proceeds to step S25. When the two objective functions are identical to each other, the routine proceeds directly to step S25, without the adjustment step of step S24. At step S25, optimization section 10*d* finds or determines the optimal correction function X*(t) with respect to the candidate solution U*(t−Δt). Subsequently, at step S26, abnormal solution detection section 10*f* determines whether or not the optimal solution including X*(t) and U*(t) is abnormal. When the answer to step S26 is affirmative (YES), the routine proceeds to step S27. On the other hand, when the answer to step S26 is negative (NO), the routine proceeds to step S34, without executing steps S27 through S33. At step S27, abnormality handling section 10*g* discards the optimal correction X*(t) and the candidate solution U*(t−Δt). Subsequently, at step S28, the abnormal solution is categorized in accordance with the equation (E28). When the equation (E28) is satisfied, that is, when the abnormal solution is due to predicted close approach to the target vehicles, the routine proceeds to step S31. When the answer to step S28 is NO, the routine proceeds to step S29. At step S29, initial solution generation section 10*h* replaces the current objective function stored in current objective function storage section 10*c* with the initial objective function which is $L_v(v_0)+L_u(u)$. Subsequently, at step S30, initial solution generation section 10*h* generates the initial optimal solution U*(t) for the initial objective function, using the equation (E30). Subsequently, the routine proceeds to step S34. At step S31, provisional desired state determination section 10*i* determines the equations (E32) and (E33) which is satisfied by the initial solution, and determines the provisional desired state of host vehicle 16 in accordance with the equations (E32) and (E33). Subsequently, at step 532, initial solution generation section 10*h* adjusts horizon to $T_f$, constructs the initial objective function by replacing vo* in $L_v(v_0)$ with the provisional desired speed, and stores the adjusted initial objective function in current objective function storage section 10*c*. Subsequently, at step S33, initial solution generation section 10*h* generates the initial optimal solution U*(t) using the equations (E37) and (E38). At step S34, control input determination section 10*k* determines the current control input in accordance with the optimal solution U*(t), calculates the electric current needed to produce the control input, and send control signals to throttle controller 12 and brake controller 14 via the current control device accordingly. In the first cycle of the control in which there is no candidate solution, initial solution generation section 5*h* is initiated unconditionally to generate the initial optimal solution.

FIGS. 11A through 11F illustrate how the model predictive control apparatus operates in a sample case in which an abnormal solution is detected. As shown in FIGS. 11A and 11D, the model predictive control apparatus detects that target vehicle B 18 is entering the left lane, and predicts that host vehicle 16 will approach close to target vehicle B 18 at time t+$T_f$ in accordance with the calculated optimal trajectory. Accordingly, the model predictive control apparatus reduces the prediction horizon, sets the provisional desired state, and finally issues the control command indicative of deceleration, as shown in FIGS. 11B and 11E. In FIGS. 11C and 11F, after target vehicle B 18 completes lane change to the left lane, the model predictive control apparatus increases the horizon to the normal value, and issues the command in accordance with the normal control so that host vehicle 16 follows target vehicle B 18 with a proper headway.

Figure 12:
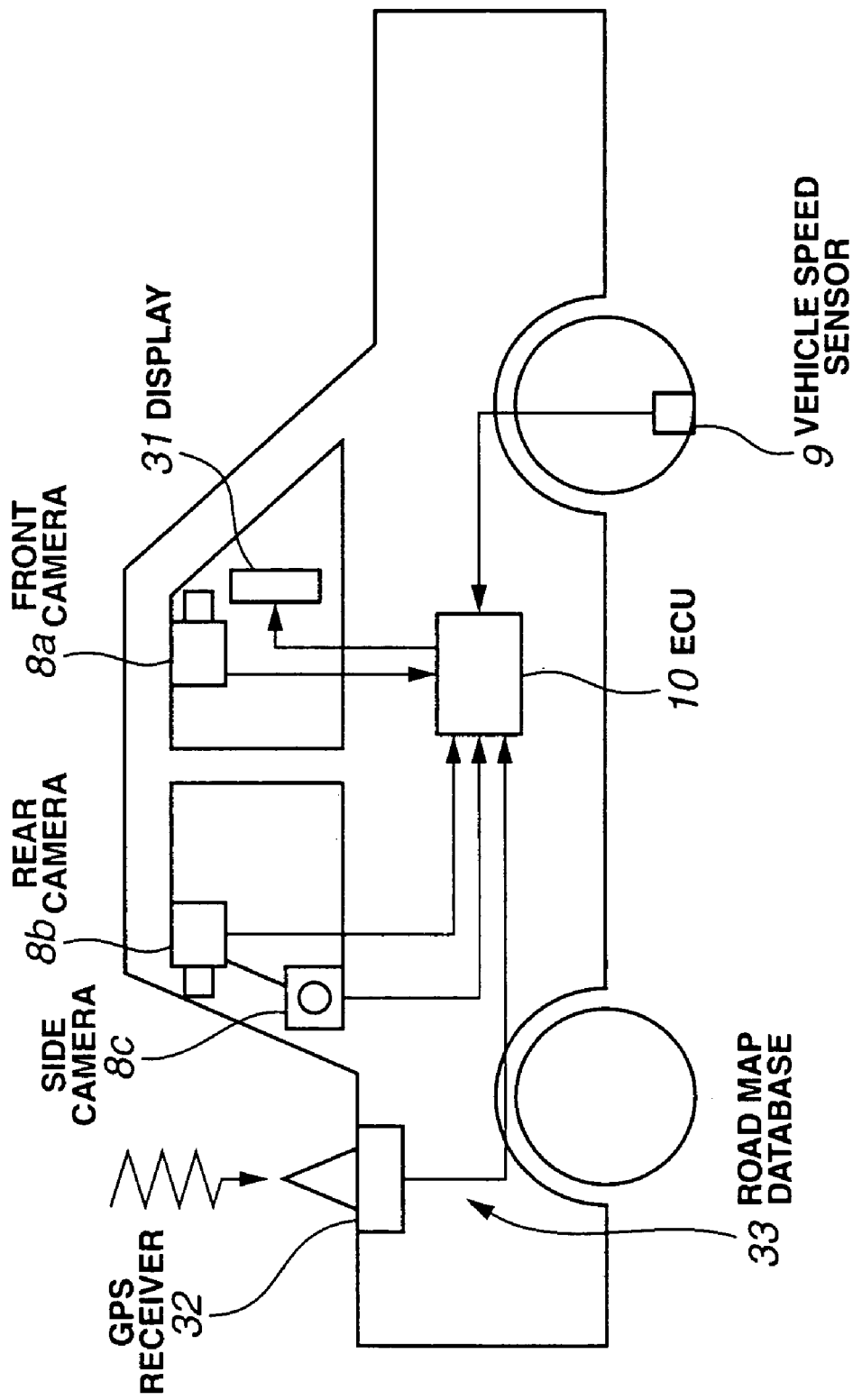
FIG. 12 is a schematic diagram of a model predictive control apparatus for an automotive vehicle in accordance with a third embodiment of the present invention.

Referring now to FIGS. 12 through 16B, there is shown a model predictive control apparatus for an automotive vehicle in accordance with a third embodiment of the present invention. FIG. 12 is a schematic diagram of the model predictive control apparatus. As shown in FIG. 12, the vehicle is equipped with cameras 8*a*, 8*b*, and 8*c*, and vehicle speed sensor 9, and ECU 10, which are same as in the second embodiment. In addition, the vehicle is equipped with ECU 10, a display 31, a GPS (Global Positioning System) receiver 32, and a road map database 33.

GPS receiver 32 is configured to receive signals from satellites to obtain its absolute geographic position. GPS receiver 32 relates the position of host vehicle 16 with the road map information stored in road map database 33, to recognize a future path, or to identify the number of lanes of a road. Thus, GPS receiver 32 and road map database 33 serve for the sensing section to detect forward lane reduction of a road on which the host vehicle is traveling.

Disposed within the host vehicle, display 31 includes an LCD (liquid crystal display) configured to display information about a recommended value of the control input in accordance with an output signal issued by ECU 10.

ECU 10 includes a microcomputer, and its peripheral devices, as in the second embodiment. ECU 10 receives signals from the sensing section, processes the signals in accordance with a program stored in its internal memory to determine the recommended control input, and outputs a control command to display 31 in accordance with the recommended control input.

Figure 13:
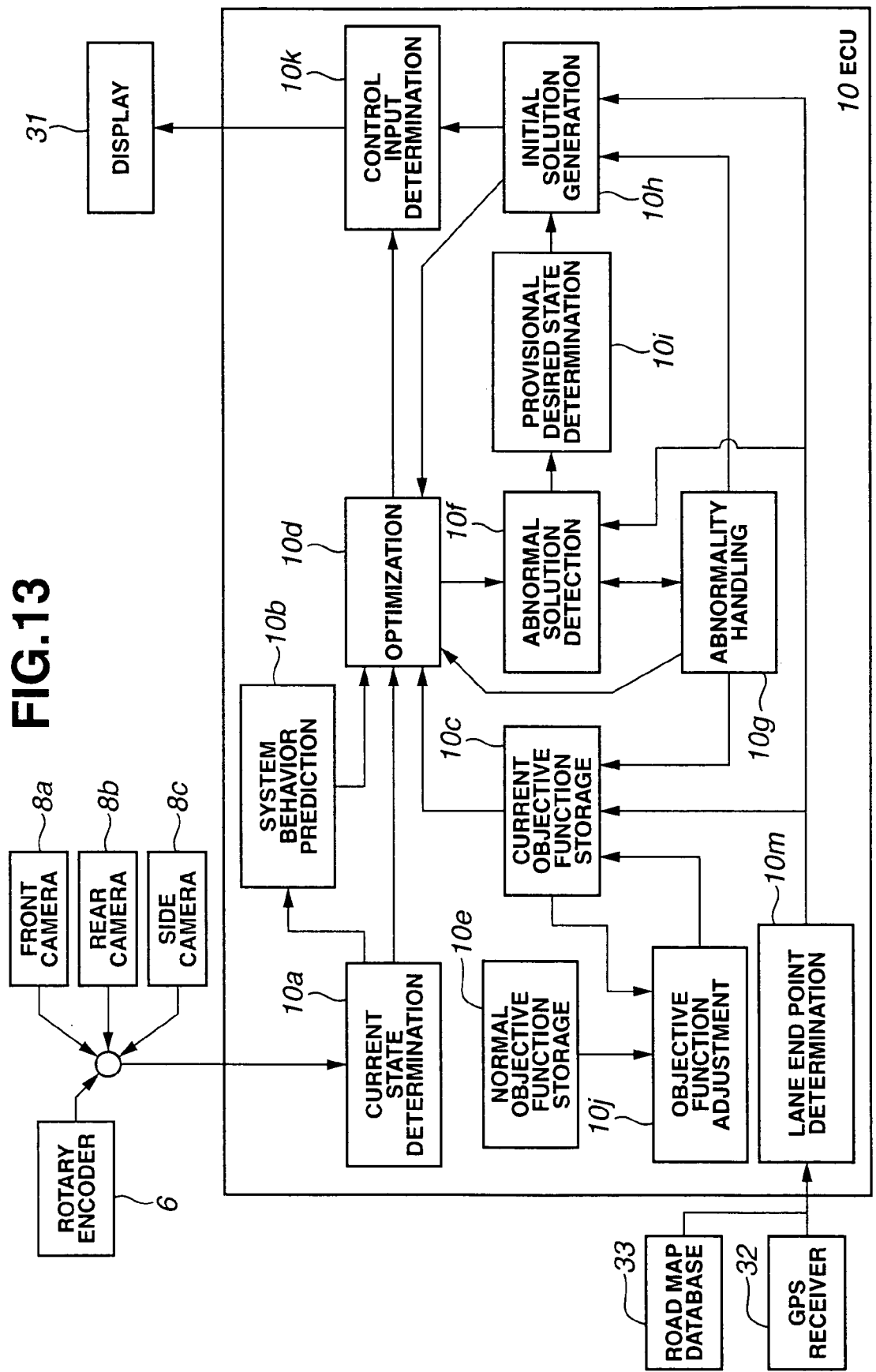
FIG. 13 is a functional block diagram of an ECU of the model predictive control apparatus in accordance with the third embodiment of the present invention.

FIG. 13 shows blocks indicative of software modules or functional sections 10a through 10m of the program stored in ECU 10. Thus, ECU 10 is equipped with an algorithm to implement the model predictive control. ECU 10 includes lane end point determination section 10m in addition to the sections of the second embodiment.

FIG. 14 illustrates how the model predictive control apparatus in accordance with the third embodiment operates. In FIG. 14, host vehicle 16, two target vehicles, i.e., target vehicle A 17, and target vehicle B 18 are traveling on a three-lane one-way road (a six-lane road). The left lane in which host vehicle 16 is traveling is terminated ahead of host vehicle 16. Accordingly, host vehicle 16 needs to perform lane change to the adjacent lane, that is, the central lane. In the shown embodiment, it is assumed that the sensing section is only capable of monitoring the current driving lane and the left and right adjacent lane. Therefore, host vehicle 16 is recognizing target vehicle A 17 but target vehicle B 18. The coordinate system is set as shown in FIG. 14, as in the second embodiment.

Current state determination section 10a is configured to calculate the current system state including the x-position, the longitudinal speed, and the lane position, of each of the vehicle concerned. The system state is defined as in the equation (E14), as in the second embodiment. In the situation as shown in FIG. 14, target vehicle B 18 is not detected. Accordingly, the system state does not include the state as to target vehicle B 18, at the instant.

Lane end point determination section 10m is configured to determine the x-position of the end point of the left lane, obtaining information about the forward road based on the GPS signal and the road map information.

System behavior prediction section 10b is configured to store the same system model as in the second embodiment. In the third embodiment, the recommended control input includes the lateral component for lane change. Accordingly, the state of host vehicle 16 includes the y-component. The model of host vehicle 16 is described by the following equation (E44).

$$\dot{x}_0 = v_0$$

$$\dot{v}_0 = u_x$$

$$\dot{y}_0 = \omega_0^y y_0 + \omega_0^y u_y \tag{E44}$$

where $u_x$ is an element of the control input indicative of the acceleration/deceleration of host vehicle 16 in the x-direction, and $u_y$ is an element of the control input indicative of an instantaneous destination lane position of host vehicle 16. The optimal value of the control input $u_x$ and $u_y$ are calculated by ECU 10 in accordance with the model predictive control.

The objective function includes the same terms as in the second embodiment, and additional two terms concerning additional two criteria. The following describes the additional criteria.

(Criterion CR4) The host vehicle is desired not to perform frequent lane changes.
(Criterion CR5) The host vehicle is desired not to approach close to a lane end point.

The term as to criterion CR4 is mathematically expressed by the following equation (E45).

$$L_y(u_y, y_0) = w_y/2(u_y - y_D)^2 \tag{E45}$$

where $w_y$ is a positive constant value representing the weight of criterion CR5 in the objective function. The right-hand term of the equation (E45) is proportional to $\dot{y}_0^2$ in consideration of the equation (E44), which serves to prevent frequent lane changes. The term as to criterion CR4 is mathematically expressed by the following equation (E46).

$$L_m(x_0, y_0) = \tag{E46}$$
$$\begin{cases} w_m \cdot c_L(y_0) \cdot \left( \dfrac{1}{x_{end} - x_0} + y \cdot (x_0 - x_{begin}) \right) & (x_{begin} \le x \le x_{end}) \\ 0 & (x < x_{begin}) \end{cases}$$

where $x_{end}$ is the x-position of the lane end point, $x_{begin}$ is the x-position of host vehicle 16 at which the model predictive control apparatus begins to control the recommended control input in consideration of the termination of the current lane, and $w_m$ is a positive constant value representing the weight of criterion CR5 in the objective function. As shown in the equation (E46), as host vehicle 16 approaches the end point of the current lane in the current lane position, the term concerning criterion CR5 increases. That is, as host vehicle 16 approaches the end point of the current lane, keeping traveling in the current lane position, the model predictive control apparatus highly evaluates, and recommends or promotes lane change to the central lane. Finally, the instantaneous objective function L is described by the following equation (E47).

$$L(x,u) = L_v(v_0) + L_u(u_x) + L_s(x) + L_y(u_y, y_0) + L_m(x_0, y_0) \tag{E47}$$

Optimization section 10d is configured to operate as in the second embodiment, except that it uses the different system model and objective function. The control input has two elements of $u_x$ and $u_y$.

Abnormal solution detection section 10f is configured to operate as in the second embodiment, except that the abnormality condition includes an additional condition in which host vehicle 16 is predicted to remain in the left lane at or beyond the lane end point. FIGS. 15A and 15B illustrate how the model predictive control apparatus operates in a sample situation in which an abnormal solution is detected in the case as shown in FIG. 14.

In the situation as shown in FIG. 14, the model predictive control apparatus of host vehicle 16 traveling in the left lane does not detect target vehicle B 18 traveling in the right lane. Accordingly, the model predictive control apparatus determines the recommended control input, only based on the relation between host vehicle 16 and target vehicle A 17, without consideration of target vehicle B 18. As a result, as shown in FIG. 15A, the model predictive control apparatus produces such a recommended control input value that host vehicle 16 waits for target vehicle A 17 to go ahead and away from host vehicle 16, and then performs lane change to the central lane. Suppose target vehicle B 18 begins to enter the central lane from the right lane at time $t_1$. With the recommended control input value determined without consideration of target vehicle B 18, target vehicle B 18 performs the lane change just after host vehicle 16 begins to perform the lane change. This recommended control input value is much different from a recommended control input value which is determined in consideration of target vehicle B 18. The recommended control input value determined without consideration of target vehicle B 18 is discarded by abnormality handling section 10g or adjusted in the normal handling by optimization section 10d so that it is recommended that host vehicle 16 keeps traveling in the current left lane. If the model predictive control apparatus selects the solution that host vehicle 16 keeps traveling in the current left lane, host vehicle 16 needs to decelerate so as not approach close to the lane end point. However, it is possible that the solution indicates that host vehicle 16 reaches a point beyond the lane end point, due to late computational operation. Therefore, such a solution is to be inhibited and discarded. Accordingly, the abnormality condition further includes a condition mathematically expressed by the following equation (E48).

$$\hat{x}_0(i) - x_{end} \geq 0, \text{ and } \hat{y}_0(i) \geq 0 \tag{E48}$$

Thus, abnormal solution detection section 10f is configured to identify a lane end point when forward lane reduction of the road is detected, and to determine that the performed optimization is abnormal when the optimal predicted value of the future time series system state includes an abnormal future value of the system state in which the host vehicle is beyond the lane end point.

Abnormality handling section 10g is configured to discard the optimal solution U*(t) and the candidate solution U*(t−Δt), and generates an initial objective function that initial solution, as in the second embodiment.

As in the second embodiment, initial solution generation section 10h is configured to generate the initial optimal solution in accordance with the initial objective function that target vehicles' weights $w_1$ and $w_2$ are both set to zero. In addition, the lane position input $u_y$ is held at 1 indicative of the left lane, because when the equation (E48) is satisfied it is often difficult that host vehicle 16 performs lane change to the central lane. Accordingly, the terms $L_y$ and $L_s$ are indeterminant in the objective function, so that the three terms $L_v$, $L_u$, and $L_m$ are only determinant in the objective function. In general, the optimal solution is difficult to describe with elementary functions because $L_m$ is a nonlinear function. However, the optimal solution is uniquely determined by the distance $x_{end} - x(t)$ from the host vehicle to the lane end point and the host vehicle speed v(t) at time t. Accordingly, the optimal solution may be predetermined for typical combination of the distance $x_{end} - x(t)$ from the host vehicle to the lane end point and the host vehicle speed v(t), by offline optimization calculation, and stored in the memory of ECU 10. Therefore, when the optimal solution is abnormal, initial solution generation section 10h generates the initial optimal solution by finding an approximate solution in the predetermined data map. Thus, initial solution generation section 10h is configured to provide a set of multiple optimal values of the time series control input with respect to multiple hypothetical values of the system state in accordance with the initial objective function, and to determine the optimal value of the time series control input in accordance with the provided set of multiple optimal values of the time series control input.

Provisional desired state determination section 10i, objective function adjustment section 10j, and control input determination section 10k are configured to operate as in the second embodiment.

The routine to be executed by ECU 10 is same as in the second embodiment, except that ECU 10 executes a step of detection of the lane end point subsequent to step S21 in FIG. 10.

Figure 16A:
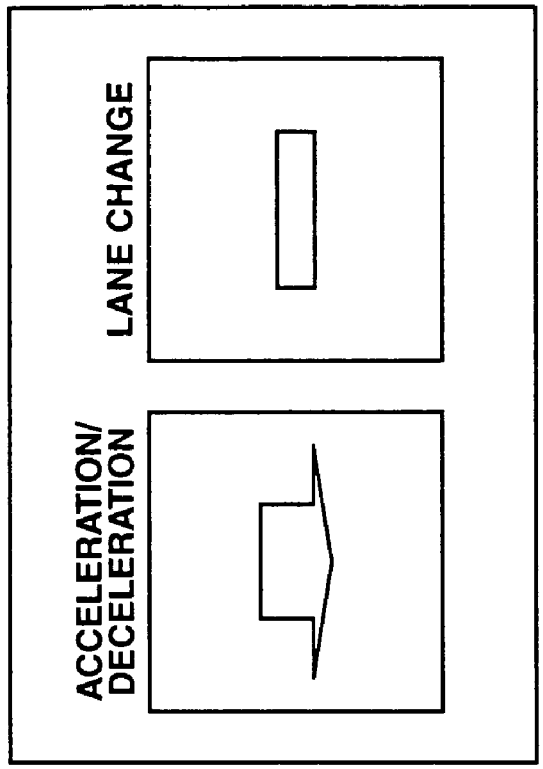
FIGS. 16A and 16B illustrate how a display of the model predictive control apparatus in accordance with the third embodiment of the present invention operates in two sample cases.
Figure 16B:
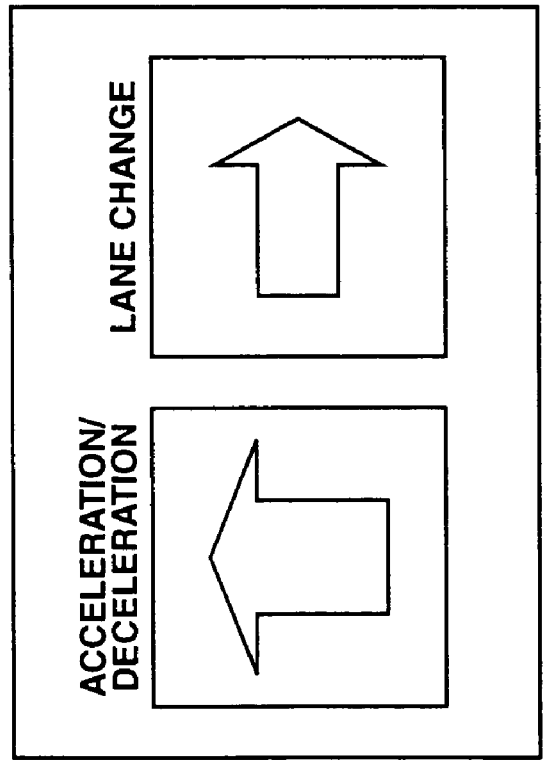

Display 31 receives control command signals indicative of the recommended control input $u_x^*(t;t)$ and $u_y^*(t;t)$ from control input determination section 10k, and provides visible information indicative of the recommended control input $u_x^*(t;t)$ and $u_y^*(t;t)$ so that a driver easily grasps the recommended control input. FIGS. 16A and 16B illustrate how display 31 operates in two sample cases. In the case of FIG. 16A in which $u_x^*(t;t)=0.62$, $u_y^*(t;t)=-1$, and $y_0(t)=1$, display 31 presents an upward arrow indicative of acceleration in accordance with a positive value of $u_x^*(t;t)$, and presents also a rightward arrow indicative of right lane change in accordance with a value of $u_y^*(t;t)$ different from $y_0(t)$. In the case of FIG. 16B in which $u_x^*(t;t)=-0.30$, $u_y^*(t;t)=1$, and $y_0(t)=1$, display 31 presents a downward arrow indicative of deceleration in accordance with a negative value of $u_x^*(t;t)$, and presents no horizontal arrow indicative of lane change in accordance with a value of $u_y^*(t;t)$ identical to $y_0(t)$.

As discussed above, when the model predictive control apparatus detects the abnormal optimal solution, the model predictive control apparatus discards the series of the optimal solution, and generates the initial optimal solution, to produce the control input or to determine the recommended control input in consideration of the future change of the environment around the host vehicle. The model predictive control apparatus adjusts the objective function based on the normal objective function which is basically desirable to describe the driving performance, and based on the initial objective function which is quickly given the optimal initial solution. After the abnormality handling, the model predictive control apparatus smoothly shifts the operation from the abnormality handling to the normal handling.

This application is based on a prior Japanese Patent Application No. 2004-157682 filed on May 27, 2004. The entire contents of this Japanese Patent Application No. 2004-157682 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A model predictive control apparatus comprising:
  a sensing section configured to measure a state of a physical system; and
  a control unit connected electrically to the sensing section for receiving a sensing signal indicative of the measured system state, the control unit comprising:
    a system behavior prediction section configured to perform the following:
      predicting a future time series of the system state over a prediction horizon of time in accordance with the measured system state, and a future time series of a control input to the system over a control horizon of time;

an objective function reference section configured to perform the following:
  providing a normal value of function definition data defining a normal objective function, the function definition data defining an objective function configured to provide a quantitative measure, in accordance with the time series system state, the time series control input, and a time series of a setpoint of the system state over the prediction horizon;
  providing an initial value of the function definition data defining an initial objective function; and
  providing a current value of the function definition data defining a current objective function;

an initial solution generation section configured to perform the following:
  setting the current function definition data value to the initial function definition data value;
  generating an initial optimal value of the time series control input in accordance with the initial function definition data value, without reference to a candidate value of the time series control input;
  setting an optimal value of the time series control input to the initial optimal value of the time series control input; and
  setting the next candidate value of the time series control input to the initial optimal value of the time series control input;

an optimization section configured to perform the following:
  calculating an optimal value of a time series control input correction over the control horizon in accordance with the current function definition data value, and the candidate value of the time series control input, the control input correction being a differential between the control input and the candidate control input value;
  setting the optimal value of the time series control input to a sum of the candidate value of the time series control input and the optimal value of the time series control input correction; and
  setting the next candidate value of the time series control input;

an abnormality handling section configured to perform the following:
  determining whether or not the performed optimization in the optimization section is abnormal; and
  performing the initial solution generation when it is determined that the performed optimization is abnormal;

an objective function adjustment section configured to perform the following:
  comparing the current function definition data value with the normal function definition data value; and
  adjusting the current function definition data value so that the current objective function varies stepwise with time toward the normal objective function when it is determined that the current function definition data value is different from the normal function definition data value; and an output section configured to perform the following:
  determining an output value of the control input in accordance with the optimal value of the time series control input; and
  outputting an output signal in accordance with the output value of the control input.

2. The model predictive control apparatus as claimed in claim 1, wherein the optimization section is configured to set the next candidate value of the time series control input to the optimal value of the time series control input.

3. The model predictive control apparatus as claimed in claim 1, wherein the adjusted current objective function is a weighted average of the initial objective function and the normal objective function, and wherein the objective function adjustment section is configured to perform the following when it is determined that the current function definition data value is different from the normal function definition data value:
  adjusting the current function definition data value so that the weights for the initial objective function and the normal objective function in the adjusted current objective function vary stepwise with time, and so that the current objective function varies stepwise with time toward the normal objective function.

4. The model predictive control apparatus as claimed in claim 1, wherein the adjusted current objective function is a weighted average of the current objective function and the normal objective function so that the current objective function varies stepwise with time toward the normal objective function.

5. The model predictive control apparatus as claimed in claim 1, wherein the abnormality handling section is configured to adjust the current function definition data value so that a current value of a length of the prediction horizon decreases from a normal value of a length of the prediction horizon so that the optimization is held normal, when it is determined that the performed optimization is abnormal.

6. The model predictive control apparatus as claimed in claim 5, wherein objective function adjustment section is configured to adjust the current function definition data value so that the current value of the prediction horizon length varies stepwise with time toward the normal value of the prediction horizon length, when the current value of the prediction horizon length is different from the normal value of the prediction horizon length.

7. The model predictive control apparatus as claimed in claim 1, wherein the initial objective function is configured to take less calculation cost to generate the optimal value of the time series control input without reference to the candidate value of the time series control input than the normal objective function.

8. The model predictive control apparatus as claimed in claim 1, wherein the normal objective function is a weighted sum of a plurality of functions, and wherein the initial objective function is a weighted sum of part of the plurality of functions.

9. The model predictive control apparatus as claimed in claim 1, wherein the initial solution generation section is configured to perform the following:
  providing an explicit function definition data value defining an explicit function to provide the optimal value of the time series control input in accordance with the initial objective function; and
  calculating the optimal value of the time series control input in accordance with the explicit function definition data value when it is determined that the current function definition data value is identical to the initial function definition data value.

10. The model predictive control apparatus as claimed in claim 1, wherein the initial solution generation section is configured to perform the following:

providing a set of multiple optimal values of the time series control input with respect to multiple hypothetical values of the system state in accordance with the initial objective function; and determining the optimal value of the time series control input in accordance with the provided set of multiple optimal values of the time series control input.

11. The model predictive control apparatus as claimed in claim 1, wherein the abnormality handling section is configured to determine that the performed optimization is abnormal when the optimal value of the time series control input correction includes a value of the control input correction whose magnitude is larger than a certain threshold value.

12. The model predictive control apparatus as claimed in claim 1, wherein the abnormality handling section is configured to determine that the performed optimization is abnormal when the optimal value of the time series control input includes a value of an element of the control input which is out of certain associated bounds.

13. The model predictive control apparatus as claimed in claim 1, wherein the optimization section is configured to calculate the optimal value of the future time series control input correction by iterative calculations the number of which is bounded by a certain upper bound; and wherein the abnormality handling section is configured to perform the following:

determining a degree of error of the performed optimization; and determining that the performed optimization is abnormal when the error degree is at or above a certain threshold level.

14. The model predictive control apparatus as claimed in claim 1, wherein the system behavior prediction section is configured to perform the following:

providing a time series of the measured system state; and predicting the future time series system state in accordance with the time series measured system state, and the time series control input.

15. The model predictive control apparatus as claimed in claim 1, wherein the system state includes a position of a movable object and a velocity of the movable object, and wherein the control input includes a physical quantity to generate an acceleration of the movable object to change the position and velocity of the movable object.

16. A model predictive control apparatus for a host automotive vehicle, comprising:

a sensing section configured to detect a target vehicle present around the host vehicle, and to measure a state of a physical system including the host vehicle and the target vehicle; and a control unit connected electrically to the sensing section for receiving a sensing signal indicative of the measured system state, the control unit comprising:

a system behavior prediction section configured to perform the following:

predicting a future time series of the system state over a prediction horizon of time in accordance with the measured system state, and a future time series of a control input to the host vehicle over a control horizon of time;

an objective function reference section configured to perform the following:

providing a normal value of function definition data defining a normal objective function, the function definition data defining an objective function configured to provide a quantitative measure, in accordance with the time series system state, the time series control input, and a time series of a setpoint of the system state over the prediction horizon;

providing an initial value of the function definition data defining an initial objective function; and providing a current value of the function definition data defining a current objective function;

an initial solution generation section configured to perform the following:

setting the current function definition data value to the initial function definition data value;

generating an initial optimal value of the time series control input in accordance with the initial function definition data value, without reference to a candidate value of the time series control input;

setting an optimal value of the time series control input to the initial optimal value of the time series control input; and setting the next candidate value of the time series control input to the initial optimal value of the time series control input;

an optimization section configured to perform the following:

calculating an optimal value of a time series control input correction over the control horizon in accordance with the current function definition data value, and the candidate value of the time series control input, the control input correction being a differential between the control input and the candidate control input value;

setting the optimal value of the time series control input to a sum of the candidate value of the time series control input and the optimal value of the time series control input correction; and setting the next candidate value of the time series control input;

an abnormality handling section configured to perform the following:

determining whether or not the performed optimization in the optimization section is abnormal; and performing the initial solution generation when it is determined that the performed optimization is abnormal;

an objective function adjustment section configured to perform the following:

comparing the current function definition data value with the normal function definition data value; and adjusting the current function definition data value so that the current objective function varies stepwise with time toward the normal objective function when it is determined that the current function definition data value is different from the normal function definition data value; and an output section configured to perform the following:

determining a recommended value of the control input in accordance with the optimal value of the time series control input; and outputting an output signal in accordance with the recommended value of the control input.

17. The model predictive control apparatus as claimed in claim 16, wherein the abnormality handling section is configured to perform the following:

determining a degree of risk of contact between the host vehicle and the target vehicle in accordance with the system state; and determining that the performed optimization is abnormal when the optimal predicted value of the time series system state includes an abnormal future value of the system state whose risk degree is at or above a certain threshold level.

18. The model predictive control apparatus as claimed in claim 17, wherein the abnormality handling section is configured to perform the following when the optimal predicted value of the time series system state includes the abnormal future value of the system state whose risk degree is at or above the threshold level:
   determining a provisional desired normal future value of the system state at a future time at which the system state is predicted to be the abnormal future value;
   reducing a current value of a length of the prediction horizon from a normal value of the prediction horizon length so that the future time is an end point of the prediction horizon; and
   adjusting the initial function definition data value so that the optimal predicted value of the time series system state in accordance with the initial objective function includes the provisional desired normal future value of the system state at the future time.

19. The model predictive control apparatus as claimed in claim 17, wherein the abnormality handling section is configured to perform the following when the optimal predicted value of the future time series system state includes the abnormal future value of the system state in which the host vehicle is beyond the lane end point:
   determining a provisional desired normal future value of the system state at a future time at which the system state is predicted to be the abnormal future value;
   reducing a current value of a length of the prediction horizon from a normal value of the prediction horizon length so that the future time is an end point of the prediction horizon; and
   adjusting the initial function definition data value so that the optimal predicted value of the time series system state in accordance with the initial objective function includes the provisional desired normal future value of the system state at the future time.

20. The model predictive control apparatus as claimed in claim 16, wherein the sensing section is configured to detect forward lane reduction of a road on which the host vehicle is traveling, and wherein the abnormality handling section is configured to perform the following:
   identifying a lane end point when forward lane reduction of the road is detected; and
   determining that the performed optimization is abnormal when the optimal predicted value of the future time series system state includes an abnormal future value of the system state in which the host vehicle is beyond the lane end point.

21. The model predictive control apparatus as claimed in claim 16, wherein the system behavior prediction section is configured to perform the following:
   providing a time series of the measured system state; and
   predicting a future time series state of the target vehicle as part of the future time series system state in accordance with the time series measured system state.

22. The model predictive control apparatus as claimed in claim 16, further comprising a control-command input device disposed in the host vehicle, and manually operable to input the setpoint of the system state.

23. The model predictive control apparatus as claimed in claim 16, further comprising a wheel torque actuator configured to adjust a wheel torque of the host vehicle as part of the control input in accordance with the output signal.

24. The model predictive control apparatus as claimed in claim 16, further comprising a display disposed in the host vehicle, and configured to display information concerning the current recommended control input value in accordance with the output signal.

25. A model predictive control apparatus comprising:
   sensing means for measuring a state of a physical system; and
   control means for receiving a sensing signal indicative of the measured system state, the control means comprising:
      system behavior prediction means for performing the following:
         predicting a future time series of the system state over a prediction horizon of time in accordance with the measured system state, and a future time series of a control input to the system over a control horizon of time;
      objective function reference means for performing the following:
         providing a normal value of function definition data defining a normal objective function, the function definition data defining an objective function configured to provide a quantitative measure, in accordance with the time series system state, the time series control input, and a time series of a setpoint of the system state over the prediction horizon;
         providing an initial value of the function definition data defining an initial objective function; and
         providing a current value of the function definition data defining a current objective function;
      initial solution generation means for performing the following:
         setting the current function definition data value to the initial function definition data value;
         generating an initial optimal value of the time series control input in accordance with the initial function definition data value, without reference to a candidate value of the time series control input;
         setting an optimal value of the time series control input to the initial optimal value of the time series control input; and
         setting the next candidate value of the time series control input to the initial optimal value of the time series control input;
      optimization means for performing the following:
         calculating an optimal value of a time series control input correction over the control horizon in accordance with the current function definition data value, and the candidate value of the time series control input, the control input correction being a differential between the control input and the candidate control input value;
         setting the optimal value of the time series control input to a sum of the candidate value of the time series control input and the optimal value of the time series control input correction; and
         setting the next candidate value of the time series control input;
      abnormality handling means for performing the following:
         determining whether or not the performed optimization in the optimization means is abnormal; and
         performing the initial solution generation when it is determined that the performed optimization is abnormal;

objective function adjustment means for performing the following:
  comparing the current function definition data value with the normal function definition data value; and
  adjusting the current function definition data value so that the current objective function varies stepwise with time toward the normal objective function when it is determined that the current function definition data value is different from the normal function definition data value; and
output means for performing the following:
  determining an output value of the control input in accordance with the optimal value of the time series control input; and
  outputting an output signal in accordance with the output value of the control input.

26. A method of controlling a model predictive control apparatus including a sensing section configured to measure a state of a physical system, and a control unit connected electrically to the sensing section for receiving a sensing signal indicative of the measured system state, the method comprising:

predicting a future time series of the system state over a prediction horizon of time in accordance with the measured system state, and a future time series of a control input to the system over a control horizon of time;

providing a normal value of function definition data defining a normal objective function, the function definition data defining an objective function configured to provide a quantitative measure, in accordance with the time series system state, the time series control input, and a time series of a setpoint of the system state over the prediction horizon;

providing an initial value of the function definition data defining an initial objective function;

providing a current value of the function definition data defining a current objective function;

setting the current function definition data value to the initial function definition data value;

generating an initial optimal value of the time series control input in accordance with the initial function definition data value, without reference to a candidate value of the time series control input;

setting an optimal value of the time series control input to the initial optimal value of the time series control input;

setting the next candidate value of the time series control input to the initial optimal value of the time series control input;

calculating an optimal value of a time series control input correction over the control horizon in accordance with the current function definition data value, and the candidate value of the time series control input, the control input correction being a differential between the control input and the candidate control input value;

setting the optimal value of the time series control input to a sum of the candidate value of the time series control input and the optimal value of the time series control input correction;

setting the next candidate value of the time series control input;

determining whether or not the performed optimization is abnormal;

performing the initial optimal value generation when it is determined that the performed optimization is abnormal;

comparing the current function definition data value with the normal function definition data value;

adjusting the current function definition data value so that the current objective function varies stepwise with time toward the normal objective function when it is determined that the current function definition data value is different from the normal function definition data value;

determining an output value of the control input in accordance with the optimal value of the time series control input; and outputting an output signal in accordance with the output value of the control input.

* * * * *